(12) United States Patent
Barker

(10) Patent No.: US 7,568,650 B2
(45) Date of Patent: Aug. 4, 2009

(54) LEVEL WIND MECHANISM

(75) Inventor: Craig H. Barker, Destin, FL (US)

(73) Assignee: Kore Gear, Inc., Destin, FL (US)

( * ) Notice: Subject to any disclaimer, the term of this patent is extended or adjusted under 35 U.S.C. 154(b) by 274 days.

(21) Appl. No.: 11/379,155

(22) Filed: Apr. 18, 2006

(65) Prior Publication Data

US 2006/0237565 A1 Oct. 26, 2006

Related U.S. Application Data

(60) Provisional application No. 60/673,165, filed on Apr. 20, 2005.

(51) Int. Cl.
*B65H 27/00* (2006.01)
(52) U.S. Cl. .................. 242/397.2; 242/277; 242/280; 242/157.1
(58) Field of Classification Search ............... 242/276, 242/273, 277, 278, 280, 281, 157 R, 397.2, 242/397.3
See application file for complete search history.

(56) References Cited

U.S. PATENT DOCUMENTS

| | | | | |
|---|---|---|---|---|
| 983,013 | A | * | 1/1911 | Wright ................. 242/276 |
| 1,001,857 | A | * | 8/1911 | Jernstedt .............. 242/278 |
| 1,521,229 | A | * | 12/1924 | Clickner ............... 242/277 |
| 1,635,629 | A | * | 7/1927 | Marcy .................. 242/276 |
| 1,792,371 | A | * | 2/1931 | Greene ................ 242/276 |
| 2,600,774 | A | * | 6/1952 | Hurd et al. ............ 242/277 |
| 2,609,161 | A | * | 9/1952 | Guhlin et al. .......... 242/277 |
| 3,598,334 | A | * | 8/1971 | Fleischer .............. 242/277 |
| 3,941,324 | A | | 3/1976 | Green |
| 4,106,714 | A | | 8/1978 | Janzen |
| 4,223,854 | A | | 9/1980 | Karlsson |
| 4,226,384 | A | | 10/1980 | Karlsson |
| 4,271,686 | A | | 6/1981 | Memminger |
| 4,493,463 | A | | 1/1985 | Rivinius |
| 4,538,937 | A | | 9/1985 | Lynch |
| 4,541,584 | A | | 9/1985 | Rivinius |
| 4,583,699 | A | | 4/1986 | Karlsson |
| 4,588,139 | A | | 5/1986 | Lines |
| 4,715,253 | A | | 12/1987 | Falgout, Sr. et al. |
| 4,747,560 | A | | 5/1988 | Karlson |
| 4,799,628 | A | * | 1/1989 | Watanabe et al. ........... 242/277 |
| 5,427,327 | A | | 6/1995 | Anderson |
| 5,601,244 | A | | 2/1997 | Kawabe |
| 5,833,155 | A | | 11/1998 | Murayama |
| 5,934,586 | A | | 8/1999 | Kang et al. |
| 6,089,489 | A | | 7/2000 | Cruickshank |

(Continued)

*Primary Examiner*—Emmanuel M Marcelo
(74) *Attorney, Agent, or Firm*—Christine Q. McLeod; Beusse Wolter Sanks Mora & Maire, P.A.

(57) ABSTRACT

The present invention provides an alternate design for a level-wind mechanism that eliminates the requirement for the line to be threaded through an enclosed, or multiple device line guide. The present invention guides the line via an open slot created between one or more line guides that pivots about its supporting structure. The line guide(s) oscillate back and forth in concert across the axial length of the spool in order to evenly distribute the line that is being wound upon the spool. Further, the line guide is capable of being pivoted from a first position of line retrieve to a second position of line dissemination when it is desired to pay out the line from the spool.

30 Claims, 24 Drawing Sheets

U.S. PATENT DOCUMENTS

| | | |
|---|---|---|
| 6,435,447 B1 | 8/2002 | Coats |
| 6,446,895 B1 * | 9/2002 | Baenziger et al. ........... 242/277 |
| 6,561,448 B2 | 5/2003 | Barker |
| 6,572,041 B2 | 6/2003 | Morise et al. |

* cited by examiner

LEVEL WIND MECHANISM

CROSS-REFERENCE TO RELATED APPLICATIONS

This application claims priority from U.S. provisional application Ser. No. 60/673,165, filed Apr. 20, 2005, the disclosure of which is incorporated herein by reference in its entirety.

FIELD OF THE INVENTION

The present invention relates to a mechanism to evenly distribute line that is being wrapped upon a spool that is being revolved about its axis. More specifically, the present invention relates to a mechanism that eliminates the requirement of an enclosed line guide in order to distribute the line equally across the axial length of the spool. Elimination of this requirement increases operational efficiency, reduces friction between the line and the guide, allows the line to be paid out from the spool more effectively, eliminates the requirement that the spool revolve counter to the direction of line retrieval in order to enable the line to be dispensed from the spool, etc. This invention is equally suitable for, but not limited to fishing reels, garden hose reels, utility cable spools, etc.

BACKGROUND OF THE INVENTION

For the purpose of this disclosure, the term "spool" generally refers to a body upon which line is wrapped. A "spool" is intended to be synonymous with the terms drum, reel, spindle, or any other body capable of accomplishing the intended purpose. Further, the term "line" is intended to be synonymous with rope, cable, strap, cord, tube, hose, pipe, wire, or any other material that is capable of being wrapped upon a "spool".

Generally speaking, spools are commonly used to contain lengths of line. Line is wound upon a spool in successive layers by revolving the spool about an axis or axle whose plane is generally normal to the plane of the line that is being wound upon the spool.

Absent a mechanism to distribute the line evenly along the axial length of a spool as it is being would upon it, it is commonplace for line to bunch or mass, which can lead to mounds of line forming in some areas along the axial length of the spool, and valleys created in other areas along the axial length of the spool where fewer wraps of line have been amassed.

In order to prevent these mounds and valleys from occurring, it is common practice to provide a mechanism to evenly distribute the line along the axial length of the spool. This mechanism, often referred to as a "level-wind" device, is used to maximize the amount of line a particular spool can contain, to avoid tangles of the line, to ensure that the line is capable of an orderly distribution, etc.

For the purpose of this disclosure, a "level-wind" generally refers to a mechanism intended to provide a means to evenly distribute the line upon the spool upon which it is being wound. The term "level-wind" is intended to be synonymous with line-guide, spooler, guide, or any other device capable of accomplishing the intended purpose. Furthermore, the term "level-wind" encompasses any mechanism capable of traversing the axial length of a spool, whether the axial length is traversed along a straight line, an arc, or by any other shaped path.

One limitation of existing level-wind mechanisms is that they require the line that is being wound upon the spool to be threaded through an enclosed guide, or a line-guide with sufficient line enclosure so that the line is incapable of accidentally escaping the line-guide device. This is problematic because it requires a manual, cumbersome, time consuming, and often-expensive sequence in order to thread the line through such a guide. Further, such an enclosure can also create undesired points of friction between itself and the line that is being wound upon the spool, which can result in degradation of the line.

Still further, the enclosed design of all existing level-wind guide mechanisms mandate that the spool must revolve in a direction counter to that of line-retrieval in order for the line to by paid out (dispensed or extracted) from the spool. Thus, when the line is to be paid out from the spool—by unwinding the spool in the opposite direction to that of line retrieval, the line must pass through the level-wind guide. This is problematic because significant friction between the line and the level-wind mechanism results if the line-guide is not also moved axially along the length of the spool in exactly the same axial rate that the line is being unwound from of the spool. As is well known in the art, level-wind mechanisms include a drive mechanism (or motive force) that provides controlled translational movement along a line parallel to the axis of the spool. Therefore, it is a condition precedent to existing level-wind devices that this drive mechanism also functions in reverse as the line is being dispensed from this spool. Thus, powering the drive mechanism in reverse equates to the entire drive mechanism suffering a tremendous efficiency loss as it seeks to maintain harmony with the axial rate with which the line is being dispensed from the spool.

Designers sometimes seek to minimize this power efficiency loss by disengaging the drive mechanism as the line is being dispensed, and thus positioning the level-wind line guide in a stationary manner as the spool revolves counter to the direction of line retrieve in order to dispense the line. However, while solving the power efficiency loss problem, another significant problem is created. Because the level-wind mechanism moved axially along the entire length of the spool in order to distribute the line in a smooth, uniform manner, the line will oscillate from one end of the spool to the other as it is being dispensed from the spool. But, because the line guide is disengaged from its drive mechanism, it is forced to remain stationary as line is being dispensed from the spool. The axially oscillatory fashion of the line being dispensed from one end of the spool and then the other, through a fixed position line guide leads to excessive points of friction and wear on the line (leading to accelerated failure of the line), diminishes the efficiency with which the line is capable of being dispensed, and can lead to significant overruns or tangles of the line.

To overcome this newly created problem, designers took an extra step of enabling the level-wind guides—in addition to the level-wind mechanism—to also be disengaged from their motive force. This enables the level-wind guides to be shifted from a first position of line retrieval to a second position where the level-wind guides are located at opposite axial ends of the spool. Because the line guides are now located in a position so as not to interfere with the line as it is being disseminated from the spool this feature did allow for a more efficient line dissemination. Obviously, though, this feature significantly increased the complexity of level-wind mechanisms as it perpetuated the requirement that the line guides be releasably engaged/disengaged from their motive force, manually shifted parallel to the axis of the spool to the second position, releasably locked and unlocked from the second position, returnable to the first position and finally re-engaged to their motive force. Level-wind mechanism in general sometimes operate under significant forces which exacerbates mechanical failure, but even at modest forces and stresses, the reliable engagement and disengagement mechanisms for the various locking devices of the prior art have proven to be challenging at best.

A number of patents describe various level wind mechanisms, including U.S. Pat. No. 3,941,324 (Green), U.S. Pat. No. 4,106,714 (Janzen), U.S. Pat. No. 4,223,854 (Karlsson), U.S. Pat. No. 4,226,384 (Karlsson), U.S. Pat. No. 4,271,686 (Memminger), U.S. Pat. No. 4,493,463 (Rivinius), U.S. Pat. No. 4,538,937 (Lynch), U.S. Pat. No. 4,541,584 (Rivinius), U.S. Pat. No. 4,583,699 (Karlsson), U.S. Pat. No. 4,588,139 (Lines), U.S. Pat. No. 4,715,253 (Falgout, et al.), U.S. Pat. No. 4,747,560 (Karlsson), U.S. Pat. No. 5,427,327 (Anderson), U.S. Pat. No. 5,601,244 (Kawabe), U.S. Pat. No. 5,833,155 (Murayama), 5,934,586 (Kang, et al.), U.S. Pat. No. 6,089,489 (Cruickshank), U.S. Pat. No. 6,435,447 (Coats), U.S. Pat. No. 6,561,448 (Barker), and U.S. Pat. No. 6,572,041 (Morise, et al.) and herein are incorporated by reference. Moreover, all patents, patent applications, provisional applications, and publications referred to or cited herein, or from which a claim for benefit of priority has been made, are incorporated herein by reference in their entirety to the extent they are not inconsistent with the explicit teachings of this specification.

BRIEF SUMMARY OF THE INVENTION

The present invention remedies the aforementioned problems in the art by replacing the enclosed line guide design with an open line-guide slot that is created between one or more separate line guides. The separate line guides are generally in the shape of a half circle (though can be of any shape as long as their outer perimeter's extend radially beyond their axis of pivot) and they oscillate back and forth (either by pivoting about an axis, or shifting laterally under a motive force) in concert across the axial length of the spool in order to evenly distribute the line across the face of the spool. Yet, when the line is to be dispensed from the spool, the separate line guides are capable of being pivoted to a second position in order to enable the line to be dispensed without having to pass between the enclose line guide. To do so, the line guides are pivoted about their axis of rotation (rather than being linearly moved apart from each other as described in the prior art) so that the line guides are capable of remaining in driving contact with each other during the entire range of pivot.

Because the line guides are able to remain in driving contact through their entire range of pivot, it is a further intention of the present invention to eliminate the requirement that the level-wind guides be first disengaged from their motive force in order to be shifted to the second position.

Still further, because the line guides are able to remain in driving contact through their entire range of pivot, it is a further intention of the present invention to eliminate the requirement that the level-wind guides be locked into the second position, and then unlocked again to return to the first position.

It is a further intention of the present invention to provide a means to enable that the line that has been wound upon a spool can be paid out again without the requirement that the spool revolve in a direction counter to that of line-retrieval. This is accomplished by supporting the spool from only one end. Thus, when the line is to be dispensed, the separate line guides are capable of pivoting to opposite sides of the spool so that the line can be slipped out over the open (unsupported) end of the spool. This eliminates the requirement that the spool revolve in a direction counter to line retrieve in order to dispense the line.

The novel design of the present invention is also advantageous over the prior art in that because the level-wind guides are capable of remaining in driving contact at all times as they traverse the length of the spool in the first position, and throughout their entire range of pivot to the second position, it is possible to incorporate a compliance or tolerance device to eliminate mechanical failure that is so prevalent of all designs in the prior art. Therefore, it is still a further intention of the present invention to provide for a tolerance device to prevent failure of the level wind components, to prevent failure of their various engagement/disengagement devices, to prevent failure of the supporting structure(s), and to prevent failure of the of the line.

In a specific embodiment, the invention includes a line guiding mechanism for distributing line along an axial length of a spool supported by a spool housing, having: a pair of line guides, wherein each line guide is coupled at either end to the spool housing transverse to the axial length of the spool such that the central portion of the line guide is disposed in front of the spool; and a driving mechanism for providing motion to each line guide such that the central portion of the line guides follow along selected arcuate paths about an axis defined by the line guide's ends. The driving mechanism effects oscillation of the pair of line guides in cooperative arcuate paths in front of the spool to evenly distribute line (that is positioned between the pair of line guides) along the axial length of the spool. The driving mechanism also effects separation of the pair of line guides in divergent arcuate paths. The arcuate paths substantially traverse the axial length of the spool. The line guides are generally incurvate along their length.

Specifically, the driving mechanism imparts an oscillatory motion to each line guide. The driving mechanism moves the pair of line guides between a first line retrieving position and a second line dispensing position. The first line retrieving position comprises positioning the pair of line guides in a parallel relationship forming a slot therebetween for capture of the line and oscillating of the pair of line guides in cooperative arcuate paths in front of the spool to evenly distribute line along the axial length of the spool. The second line dispensing position comprises separation of the central portion of each line guide in divergent arcuate paths. The line guides remain separated at substantially opposite axial ends of the spool throughout dispensing of the line. Moreover, the driving mechanism imparts an oscillatory motion to each line guide. The imparted oscillatory motion can be derived from the motive force applied to revolve the spool when retrieving the line, or from an external source.

Additionally, the driving mechanism comprises a self-actuation switch that reverses the direction of travel of the pair of line guides upon reaching axial ends of the spool. The driving mechanism comprises an activation switch for effecting separation of the central portion of each line guide in divergent arcuate paths. The line guides remain separated at substantially opposite axial ends of the spool while the switch is activated for dispensing of the line. The pair of line guides are capable of remaining in driving contact with the driving mechanism as the line guides move between the first line retrieving position and the second line dispensing position. The line guiding mechanism further includes a compliancy device to allow the line guide(s) to flex due to forces on the line.

In another embodiment, the invention includes a line guiding mechanism for distributing line along an axial length of a spool supported by a spool housing, comprising: a pair of line guides, wherein each line guide is coupled at either end to the spool housing transverse to the axial length of the spool such that the central portion of the line guide is disposed in front of the spool; and a driving mechanism for providing motion to the pair of line guides between (a) a first line retrieving position wherein the pair of line guides traverse the axial length of the spool in unison along a linear path and (b) a second line dispensing position wherein the central portion of the pair of line guides separate in divergent arcuate paths about an axis defined by the line guide's ends. In the first line retrieving position, the pair of line guides are positioned in a parallel relationship forming a slot therebetween for capture of the line. But, in the second line dispensing position, the central portion of each of the line guides remain separated at substantially opposite axial ends of the spool.

The driving mechanism comprises a self-actuation switch that reverses the direction of travel of the pair of line guides upon reaching axial ends of the spool. The driving mechanism also comprises an activation switch for effecting separation of the central portion of each line guide in divergent arcuate paths. The pair of line guides are capable of remaining in driving contact with the driving mechanism as the line guides move between the first line retrieving position and the second line dispensing position. The line guiding mechanism further includes a compliancy device to allow the line guide(s) to flex due to forces on the line.

In still a further embodiment, the invention includes a line guiding mechanism for distributing line along an axial length of a spool supported by a spool housing, comprising: a bifurcated line guide with at least one end coupled to the spool housing, wherein the line guide has a closed end and an open end, the open end forming an elongated slot through which a line is captured, such that the elongated slot is transverse to the axial length of the spool and disposed in front of the spool; and a driving mechanism for providing oscillatory motion to the line guide along an arcuate path about an axis transverse to the axial length of the spool and intersecting the at least one end of the line guide that is coupled to the spool housing. The line guide is generally incurvate along its length. The elongated slot substantially traverses the axial length of the spool along an arcuate path. The driving mechanism imparts an oscillatory motion to the line guide. The driving mechanism comprises a self-actuation switch that reverses the direction of travel of the line guide upon reaching axial ends of the spool.

The line guide can be selectively positioned between (a) a first line retrieving position wherein the elongated slot of the line is capable of substantially traversing the axial length of the spool in order to evenly distribute the line and (b) a second line dispensing position wherein the line guide is located non-disposed within the spool such that the line is allowed to be paid out (or dispensed) from the spool without interference. The driving mechanism comprises an activation switch for effecting the positioning of the line guide from a first line retrieving position to a second line dispensing position. The line guide remains in second line dispensing position while the switch is activated for dispensing of the line. The line guide remains in driving contact with the driving mechanism as the line guide is positioned between the first line retrieving position and the second line dispensing position. The line guiding mechanism includes a compliancy device to allow the line guide to flex due to forces on the line.

In still a further embodiment, in a convertible fishing reel selectively positionable between a first line retrieving position wherein the line retrieve is substantially perpendicular to the axial length of the spool, and a second line dispensing position wherein the line payout is substantially parallel to the axial length of the spool, having a main-body chassis housing and a spool chassis, wherein the spool chassis receives a spool, and wherein the spool chassis can be selectively rotated between the first line retrieving position and the second line dispensing position, an improved line guiding mechanism of the invention includes: a pair of line guides, wherein each line guide is coupled at either end to its supporting chassis, and wherein the line guides can be selectively positioned between (1) a first line retrieving position wherein the pair of line guides are positioned in a parallel relationship forming a slot therebetween for capture of the line and oscillation in cooperative arcuate paths in front of the spool to evenly distribute line along the axial length of the spool and (2) a second line dispensing position wherein the pair of line guides separate to either side of the spool in divergent arcuate paths about an axis defined by the line guide's ends. The spool support chassis is selectively rotated about an axis of rotation that is generally disposed within the spool. The pair of line guides remain separated in the second line dispensing position to allow payout of the line without interference. The rotating of the spool support chassis between the first line retrieving position and the second line dispensing position effects positioning of the line guides between the first line retrieving position and the second line dispensing position.

The line guiding mechanism further includes a driving mechanism for providing motion to each line guide along selected arcuate paths about an axis defined by the line guide's ends. The pair of line guides are capable of remaining in driving contact with the driving mechanism as the line guides move between the first line retrieving position and the second line dispensing position. The line guiding mechanism further includes a compliancy device to allow the line guides to flex due to forces on the line.

BRIEF DESCRIPTION OF THE DRAWINGS

The manner by which the above objects and other objects, features, and advantages of the present invention are attained will be fully apparent from the following detailed descriptions of the embodiments when considered in view of the drawings wherein.

DETAILED DISCLOSURE OF THE PRESENT INVENTION

The designs of cradles, support mounts or chassis's, spools, and level-winds are generally known in the art and will be apparent to one of ordinary skill in the art. Accordingly, the particulars of their designs will not be discussed in detail.

The present invention remedies the noted problems in the art by replacing the enclosed or semi-enclosed line guides prevalent of the existing art with a line-guiding slot that is created by at least one line guide that has two sides and an open slot, or more generally, two separate line guides that together form a line guiding slot.

Figure 1:
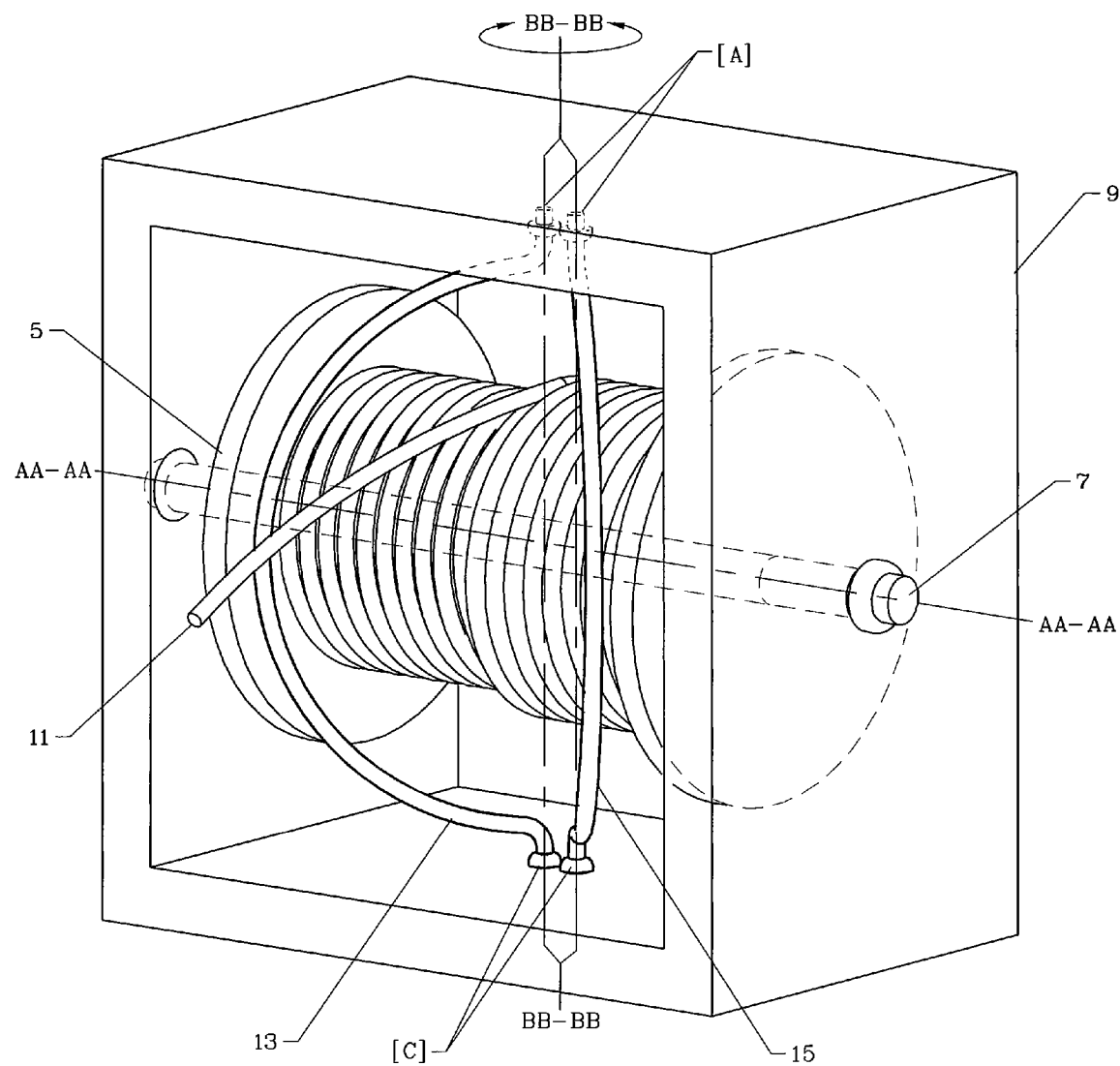
FIG. 1 is a frontal perspective of the present invention in the line dispensing position

Referring to FIG. 1, the spool 5 is supported by the spool axle 7 (the spool 5 can be supported at one or more positions), so that the spool 5 revolves about axis AA-AA. The spool axle 7 is rotatably supported by the spool support chassis 9 so that the spool 5 is disposed within the spool support chassis 9. The spool 5 revolves about the spool axle 7 (axis AA-AA) in order to wind the line 11 upon the spool 5 in successive layers (although this disclosure describes the spool 5 revolving about a spool axle 7, it is not a requirement of the present invention that a spool axle 7 be provided as the spool 5 itself can be supported by the spool support chassis 9, and thus eliminate the requirement of the spool axle 7).

The spool 5 is preferably revolved about the spool axle 7 by any motive force (such as an electric motor, manual crank, gear drive, chain drive, belt drive, rope drive, slew drive, winch or winch drive, crawler drive, wheel drive, drive link, aerator drive, pump drive, hydraulic drive, electric drive, or any arrangement of lever arms, belts, pulleys, sprockets, cables, cords, springs, cams, rollers, wheels, magnetic devices, linear actuators, racks, rails, sensors, switches, clutches, hydraulic devices, electrical devices, gears, chains, shafts, etc., and the design and/or sequence of the motive force which drives the spool 5 may vary without straying from the purview of the present invention) and are generally known in the art and will be apparent to one of ordinary skill in the art. Accordingly, the particulars of their designs will not be discussed in detail.

The line guides 13 and 15 may be formed of any shape and from any material, and may contain a hard coating film on their outer periphery. For the purposes of this disclosure, the two line guides 13 and 15 are shown rotatably connected to the spool support chassis 9 in at least one position. However, the two line guides 13 and 15 can generally be connected or supported to any structure capable of lending support for their pivoting movement without departing from the spirit or teaching of this invention. Still referring to FIG. 1, the line guides 13 and 15 are affixed to the spool support chassis 9 at point A at the top of the spool support chassis 9 and point C at the bottom of the spool support chassis 9. Points A on the top of the spool support chassis 9 and points C on the bottom of the spool support chassis 9 define an axis of rotation (BB-BB) for line guides 13 and 15. The line guides 13 and 15 can be of any shape or any size—as long as their outer perimeters extend radially beyond their axis of pivot—and generally span at least the distance (length) from where they are supported by the spool support chassis 9 to a point where the line 11 is emanating from the spool 5. In FIG. 1, the line guides 13 and 15 are pivoted to a position near the opposite axial ends of the spool 5 so that they do not interfere with the line 11 and the line 11 can be dispensed from the spool 5 with no interference by the level-wind mechanism.

Figure 2:
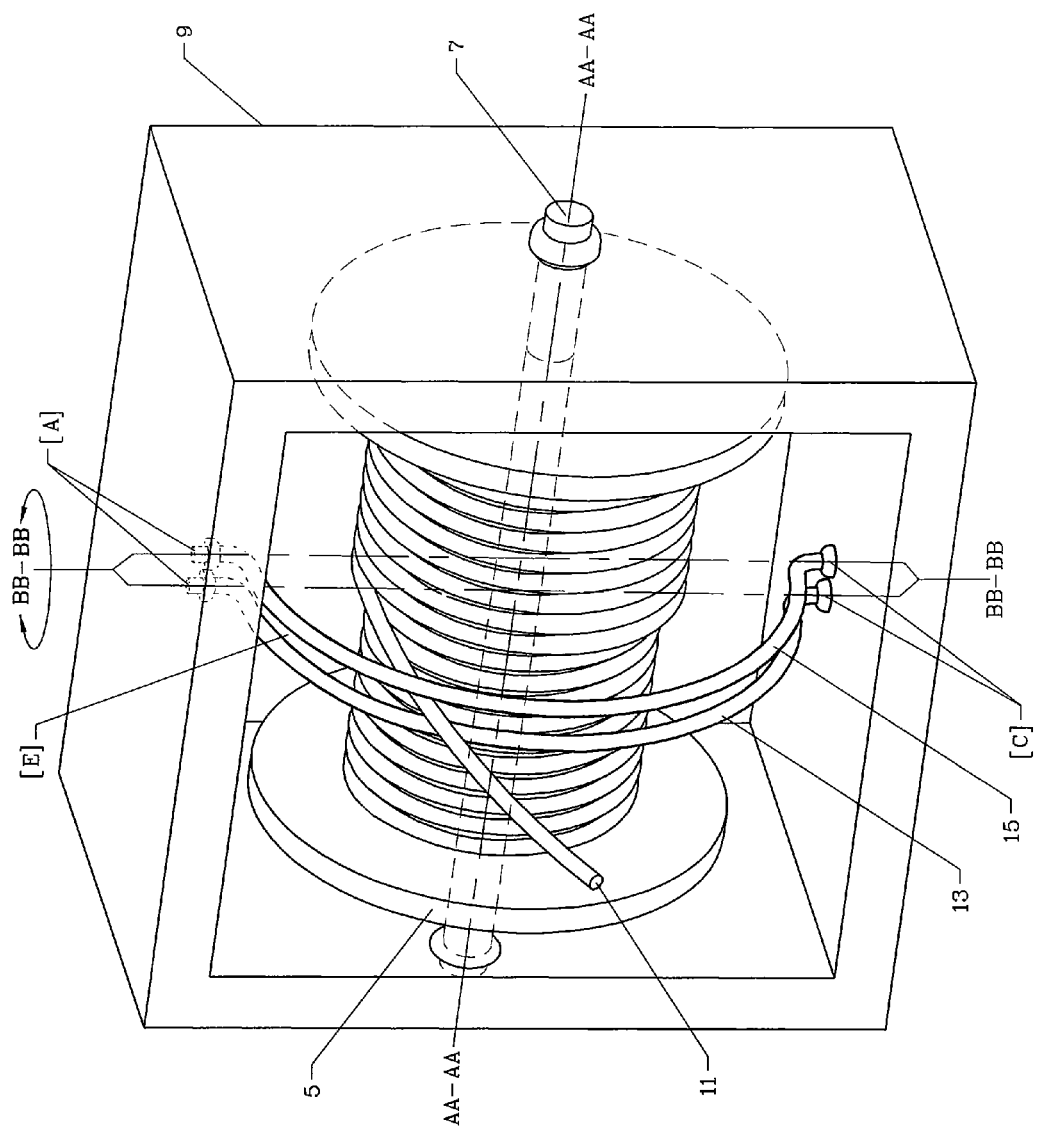
FIG. 2 is a frontal perspective of the present invention in the line guiding position

Referring now to FIG. 2, the line guides 13 and 15 have been pivoted closer together (about axis BB-BB) so that together they form a slot (position E). No matter what angle or from what position the line 11 is emanating from the spool 5, the line guides 13 and 15 will capture the line 11 so that the line 11 is positioned between the line guides 13 and 15 as they pivot together to form the slot E. Although this disclosure presents the line 11 being retrieved onto and dispensed from the top of the spool 5, the present invention is equally suited for the case when the line 11 is being retrieved onto and dispensed from the bottom of the spool 5. Furthermore, the present invention is equally suited for any axial orientation of the spool 5, whether the spool 5 axis is oriented horizontally (as shown in FIG. 2), oriented vertically, or oriented in any other possible angle or arrangement.

The line guides 13 and 15 close together to form the line guide slot E, and it is the line guide slot E within which the line 11 is captured. The line guide slot E guides the line 11 along the axial length of the spool as the line guides 13 and 15 oscillate in unison (about axis BB-BB) from one axial end of the spool 5 to the other. In this manner, the line 11 can be evenly distributed along the entire length of the spool 5 in successive layers as the spool 5 is rotating about the spool axle 7 (axis AA-AA) in order to retrieve the line 11.

Figure 3:
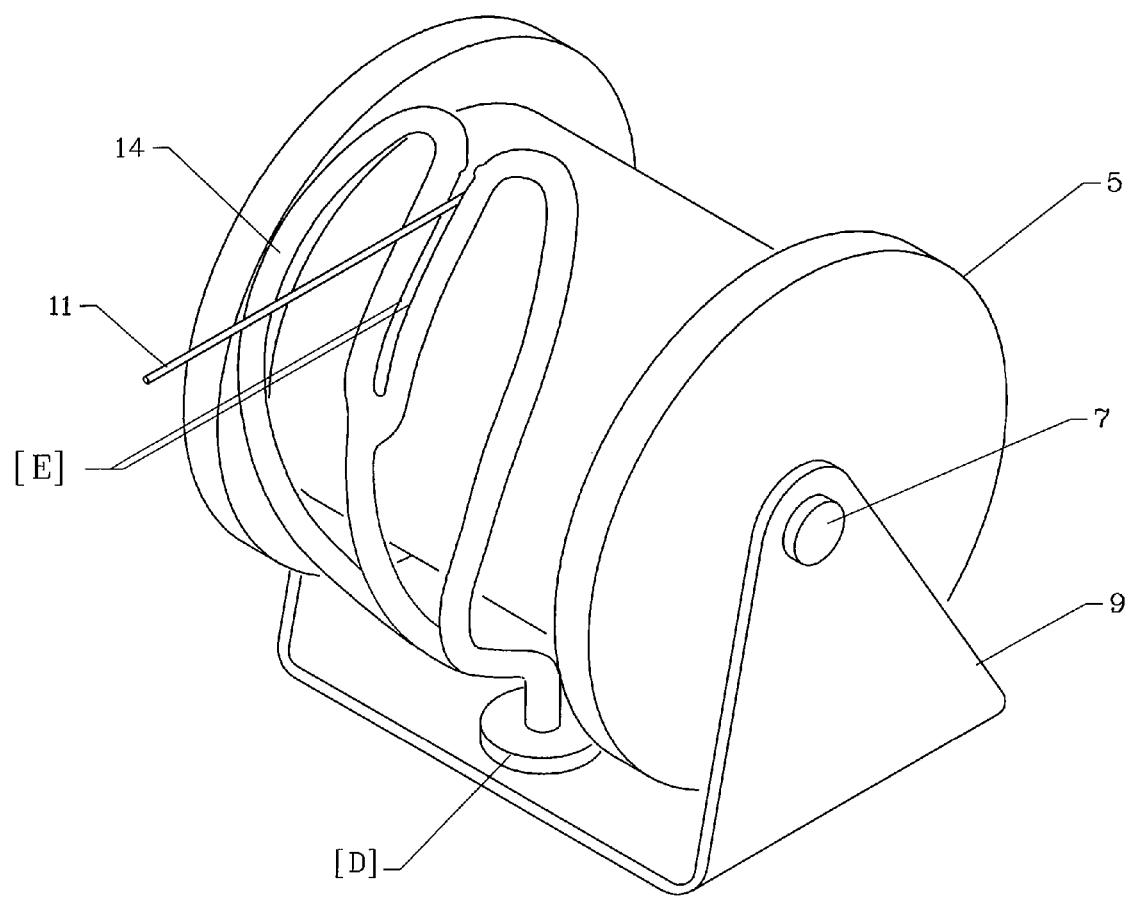
FIG. 3 is a frontal perspective of the present invention with a single line guide in the line guiding position

FIG. 3 details an alternate design for the level-wind mechanism whereby a single line guide 14 is pivotally supported by the spool support chassis 9 at position D has replaced the two independent line guides 13 and 15. The single line guide 14 operates in the same manner as the two independent line guides 13 and 15 do by oscillating from one axial edge of the spool 5 to the other axial edge of the spool 5 about a single axis of pivot D. The line 11 is evenly distributed along the entire length of the spool 5 as slot E that is formed by the edges of the single line guide 14 oscillate from one axial end of the spool 5 to the other. The single line guide 14 is also capable of eliminating the requirement that the line 11 be threaded through an enclosed or multiple-device guide. By angling at least one edge of the single line guide 14 to take advantage of ever-present mechanical forces that seek to minimize the angle at which the line 11 approaches the spool 5 upon which the line 11 is being wound, the line 11 will seek to automatically position itself within slot E.

Still referring to FIG. 3, because the single line guide 14 is pivoting about a single axis of pivot D the line-guide slot E will traverse the entire length of the spool 5 in the shape of an arc (as viewed from an aerial perspective). However, the design of the single line guide 14 is equally suitable to traverse the axial length of the spool 5 along a plane or vector that is substantially parallel to the axle of the spool 5 upon which the line 11 is being wound—such as with a barrel cam and follower, or any other linear motion device. It should be noted that while FIG. 3 depicts the single line guide 14 with its edges symmetrically angled on both sides, the design is equally suitable if only a one edge of the singe line guide 14 contains an angle. Further, while FIG. 3 depicts the line-guide slot E opening upward, the same design is equally useful if the line-guide slot E opens downward.

Likewise, the line guide 14 shown in FIG. 3 is shown pivotally supported by the spool support chassis 9 at a single position D. This design is also equally adaptable if one of the legs of the line guide 14 extends upward so that it is also pivotally supported at the top of the spool support chassis 9 at a second position (not shown).

FIRST EXAMPLE

Figure 4:
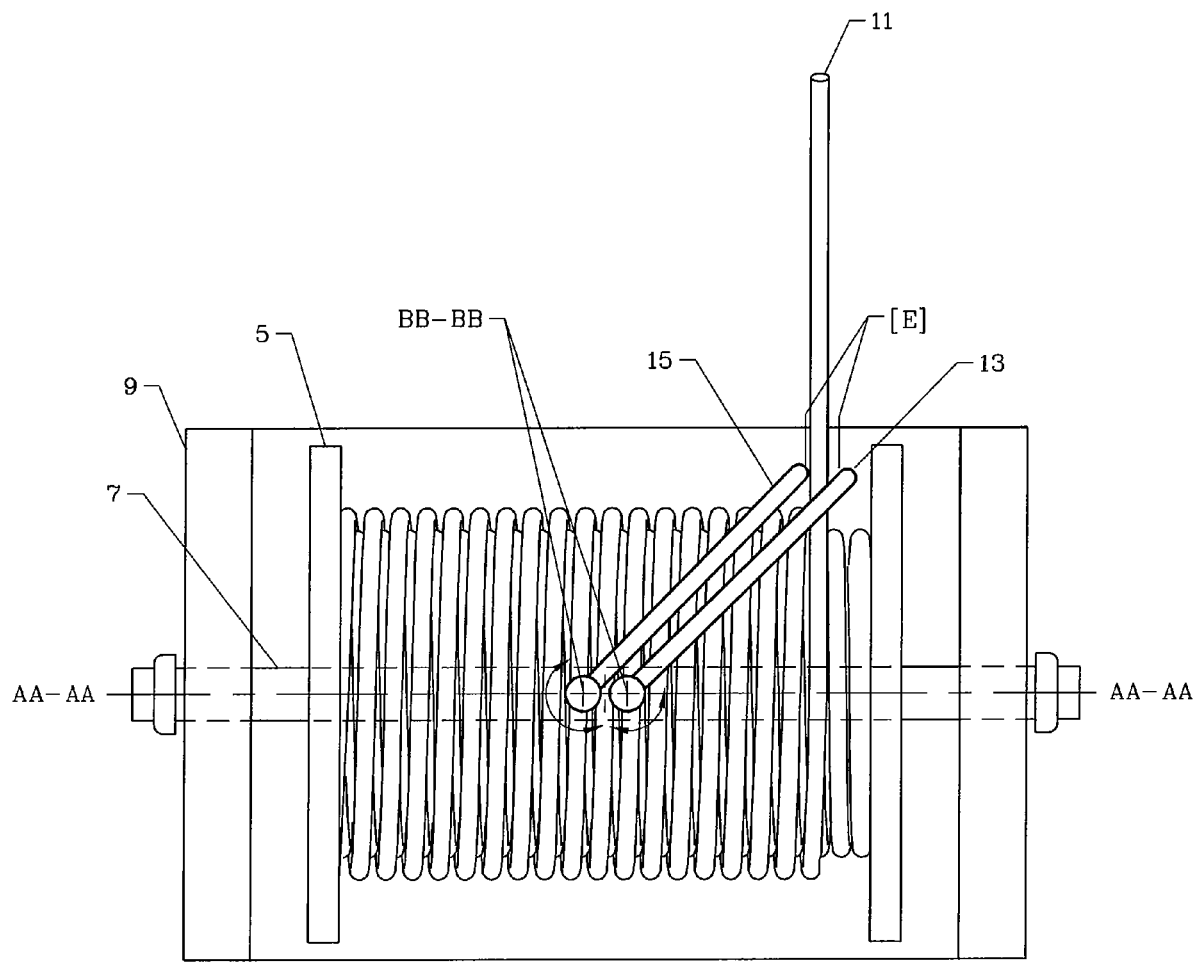
FIG. 4 is a top view of the present invention with the line guides shifted together to form the line guide slot and showing the line guides oscillated to the right-hand axial edge of the spool

FIG. 4 is a top view of the present invention with the line guides 13 and 15 pivotally connected to the spool support chassis 9 in at least one position. The line guides 13 and 15 are pivoted together to form the line guide slot E and the line guides 13 and 15, and thus the line 11, are oscillated (about axis BB-BB) to the right-hand axial edge of the spool 5.

Figure 5:
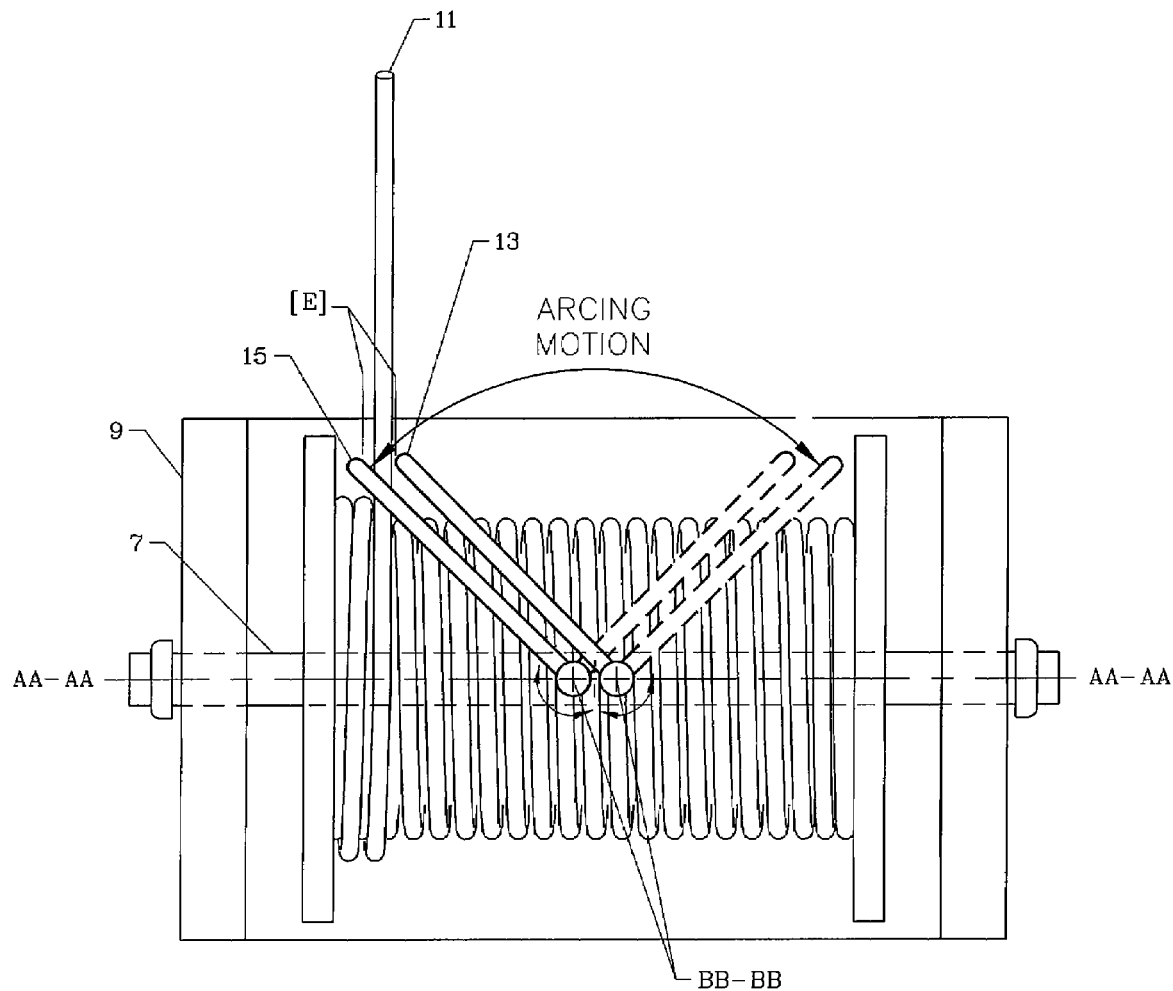
FIG. 5 is a top view of the present invention with the line guides shifted together to form the line guide slot and showing the line guides oscillated to the left-hand axial edge of the spool following a path that is shaped like that of an arc

FIG. 5 is a top view of the present invention with the line guides 13 and 15 pivoted together to form the line guide slot E, and showing the line guides 13 and 15 and thus, the line 11 oscillated (about axis BB-BB) back to the left-hand axial edge of the spool 5. Because the line guides 13 and 15 are pivotally supported by the spool support chassis 9, the line guide slot E that is formed between the line guides 13 and 15, travels from the right-hand axial edge of the spool 5 (depicted in FIG. 4) to the left-hand edge of the spool 5 following a path that is arc shaped. Because the line 11 is captured within line guide slot E, the line 11 travels from the right-hand axial edge of the spool 5 to the left-hand axial edge of the spool 5 in concert with the line guide slot E.

Figure 6:
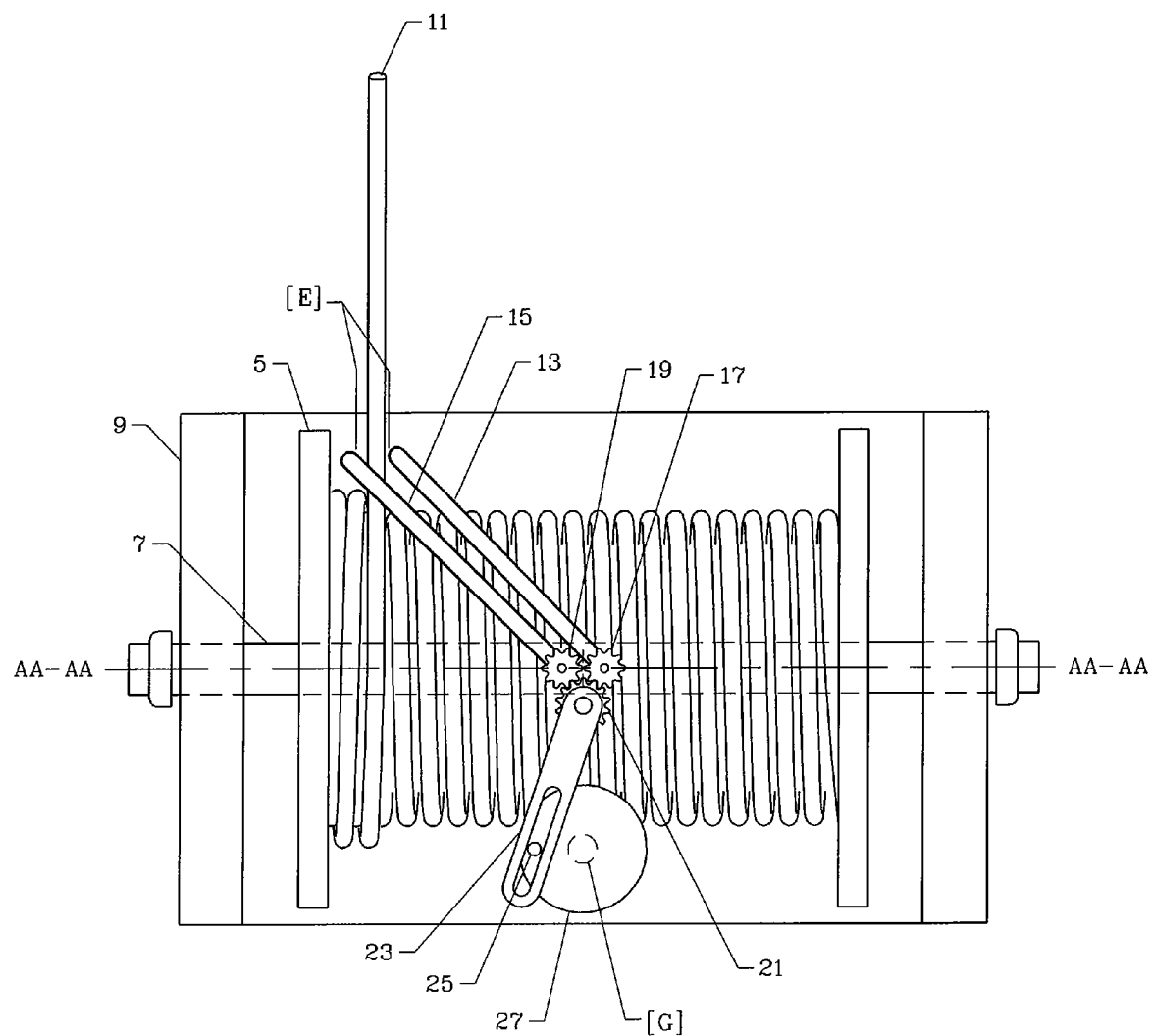
FIG. 6 is a top view of one example of the present invention with arcing motive force for line-guide oscillation derived from offset eccentric cam.

FIG. 6 shows one example of how the line guides 13 and 15 might receive a motive force in order to pivot from left to right and from right to left in an oscillatory fashion. Gear 17 is affixed to line guide 13 and gear 19 is affixed to line guide 15. Gear 17 and gear 19 are not in contact with each other, but both gear 17 and gear 19 are in driving contact with gear 21. The axis of rotation of gear 21 is rigidly attached to and forms the axis of pivot for cam follower 23, which, in turn, is drivingly engaged with cam 25 that is attached to and protrudes from the surface of rotating member 27 that revolves about an axis at position G. Rotating member 27 receives a motive force (motive force can be exerted by any mechanism such as an electric motor, manual crank, gear drive, chain drive, belt drive, rope drive, slew drive, winch or winch drive, crawler drive, wheel drive, drive link, aerator drive, pump drive, hydraulic drive, electric drive, or any arrangement of lever arms, belts, pulleys, sprockets, cables, cords, springs, cams, rollers, wheels, magnetic devices, linear actuators, racks, rails, sensors, switches, clutches, hydraulic devices, electrical devices, gears, chains, shafts, etc., and the design and/or sequence of the motive force which drives the rotating member 27 may vary without straying from the purview of the present invention) causing it to revolve about its axis (position G) so that the eccentric cam 25 orbits equidistant about the axis (position G) of rotating member 27. Because cam follower 23 is drivingly engaged with the cam 25 and connected to gear 21, one revolution of the cam 25 causes two passes of the cam follower 23 from left to right and back again or from right to left and back again. Because gear 17 and gear 19 are in driving contact with gear 21, and gear 17 and gear 19 are affixed to line guide 13 and 15, each revolution of cam 25 also causes two passes of the line guides 13 and 15, and thus, the line guide slot E. So, the present invention includes a self-actuation switch that reverses the direction of travel of line guides 13 and 15 once the axial ends of the spool 5 are reached. Thus, during operation, the line guide slot E moves in an oscillatory translational fashion and is capable of wrapping the line 11 upon the spool 5 in an even and orderly fashion.

Figure 10:
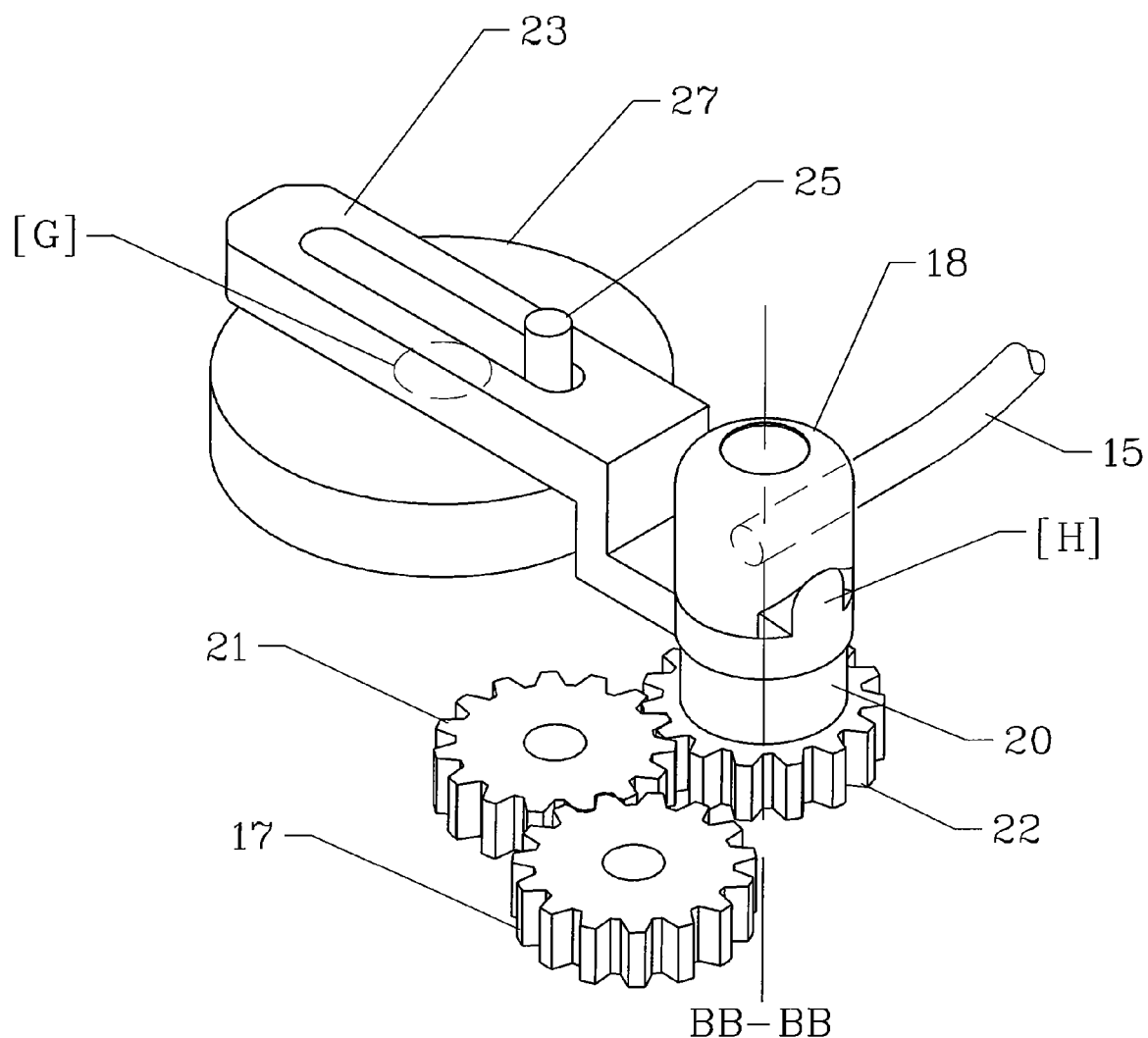
FIG. 10 is a frontal perspective of the present invention showing a motive force attached to a line guide (rather than the pivot switch) and one example of a mechanical compliance device

It should be noted that while FIG. 6 describes a motive force being exerted upon gear 21 in order to oscillate the line guides 13 and 15 from one side of the spool 5 to the other, the present invention is equally adaptable for any type of motive force to exert its power on any of the level wind components such as gears 19, 17, or 21 as demonstrated in FIG. 10.

It should further be noted that while FIG. 6 describes a motive force being applied to gear 21 which, because of its driving connection with gears 17 and 19, imparts an oscillatory rotational movement to the level wind wires 13 and 15, the present invention is equally adaptable for the case when there is no central gear 21 that is meshed with both gears 17 and 19 that are attached to the level wind wires 13 and 15. In this case, the central gear 21 is replaced by a drive link (not illustrated) that is drivingly connected to each level wind wire 13 and 15. Thus, when a motive force of any kind imparts an oscillatory motion directly to either of the level wind wires 13 or 15, the drive link would, because of its driving engagement with the other wire 13 or 15, cause the other level wind wire 13 or 15 to oscillate about axis BB-BB.

All prior art that enables its line guides to be shifted from a first position of line retrieve to a second position of line dissemination requires and describes a device that first disengages the line guides from their oscillatory motive force, followed by a separate motive force to shift the line guides from a first position of line retrieve to a second position of line dissemination, followed by a method of locking the line guides into the second position, followed by a method to release the line guides from the second position, followed by a separate motive force to again shift the line guides back to the first position, and finally followed by a mechanism to re-engage the line guides back to their original motive force. It is one object of the present invention to eliminate all of these shortcomings. This is easily accomplished in the present invention because the line guides 13 and 15 remain in constant driving connection at all times—while distributing the line 11 back and forth along the axial width of the spool 5 in the first position of line 11 retrieve, while the line guides 13 and 15 are being pivoted to a second position of line 11 dissemination, while the guides 13 and 15 are held in the second position of line 11 dissemination while the line 11 is disseminated, and as the line guides 13 and 15 are pivoted back to the first position of line 11 retrieve. Therefore, all the extraneous, but required locking/unlocking devices described in the prior art are eliminated by the present invention.

Figure 7:
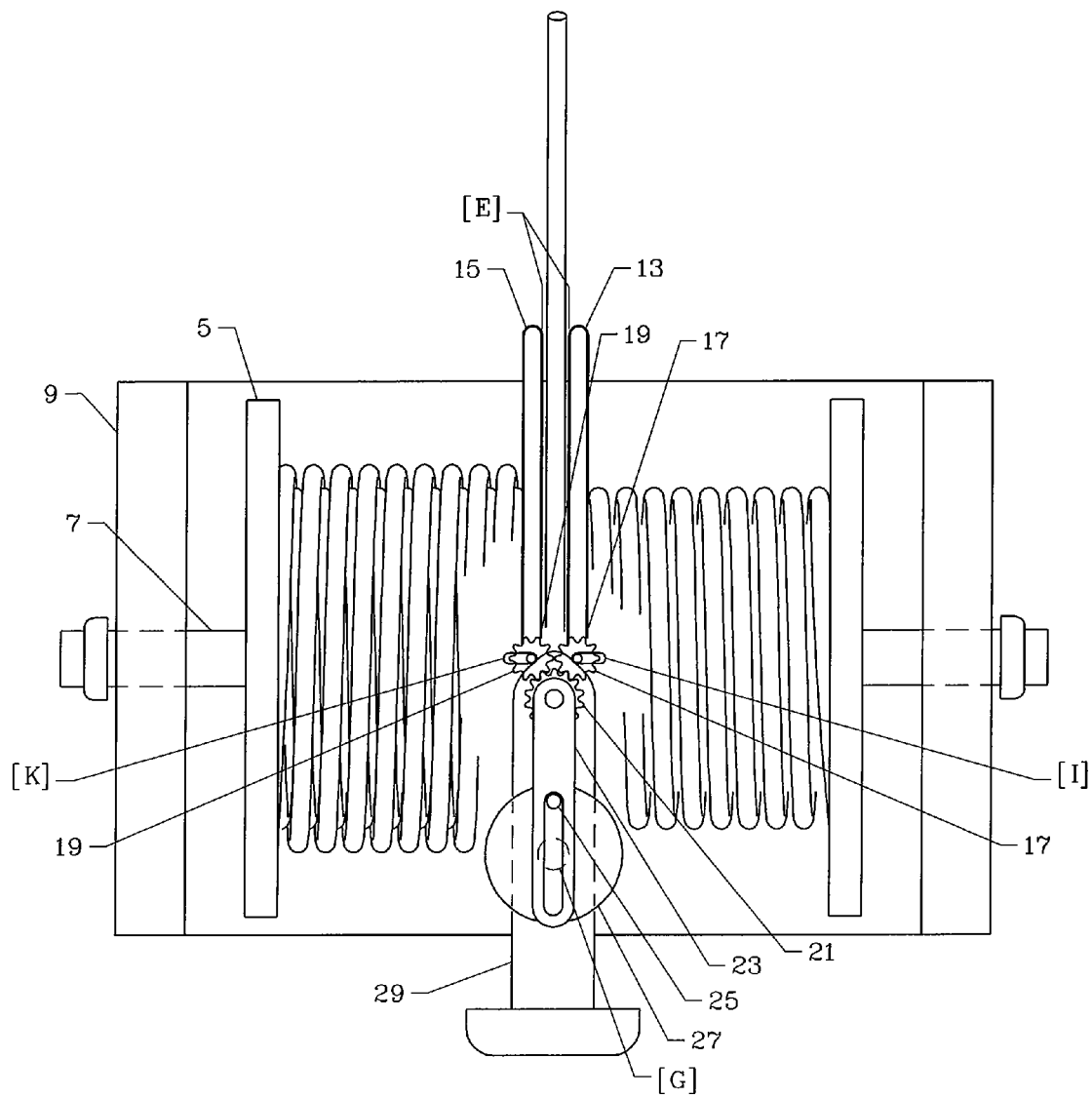
FIG. 7 is a top view of the present invention illustrating one example of a line guide pivot switch mechanism for the line-guide oscillation described in FIG. 6

FIG. 7 is a top view of the present invention illustrating one example of a line guide pivot switch 29 for the motive force as described in FIG. 6 above. Although it is not a requirement of the present invention, the axis (position G) of rotating member 27, and thus eccentric cam 25, as well as the cam follower 23, and thus gear 21, are shown rotatably connected to pivot switch 29. However, only gear 21 need be affixed to the pivot switch 29 in order for the pivot switch 29 to switch the line guides 13 and 15 from a first position of line retrieve to a second position of line 11 dissemination.

Figure 9:
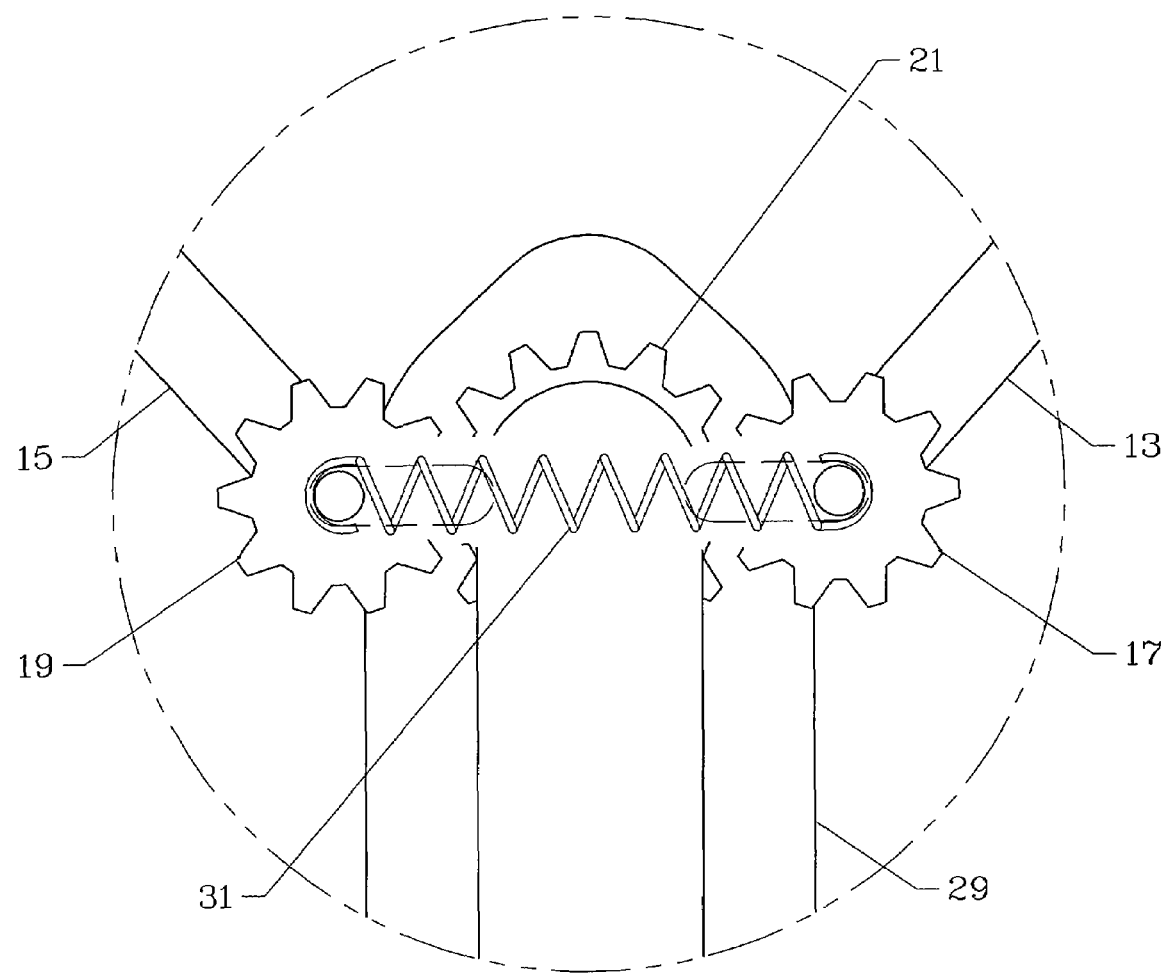
FIG. 9 is an enlarged top view detailing the pivot switch mechanism shown in FIG. 8 activated to switch the line guides to the line dispensing position

The axles of revolution of gear 17 and gear 19 are operably connected to each other by a spring 31 (shown in detail in FIG. 9). The axles of revolution of Gears 17 and 19 are confined to horizontal slots (Position I and K) in the spool support chassis 9 such that the axis of gears 17 and 19 are limited to moving further away from each other in a longitudinal direction only. It should be noted that while FIG. 7 describes the axis (position G) of rotating member 27, and thus eccentric cam 25, as well as the cam follower 23, and thus gear 21, being rotatably connected to pivot switch 29, the motive force of the eccentric cam 25 can be imparted to one of the other level-wind components such as gears 19 or 17 and still accomplish the end result.

Figure 8:
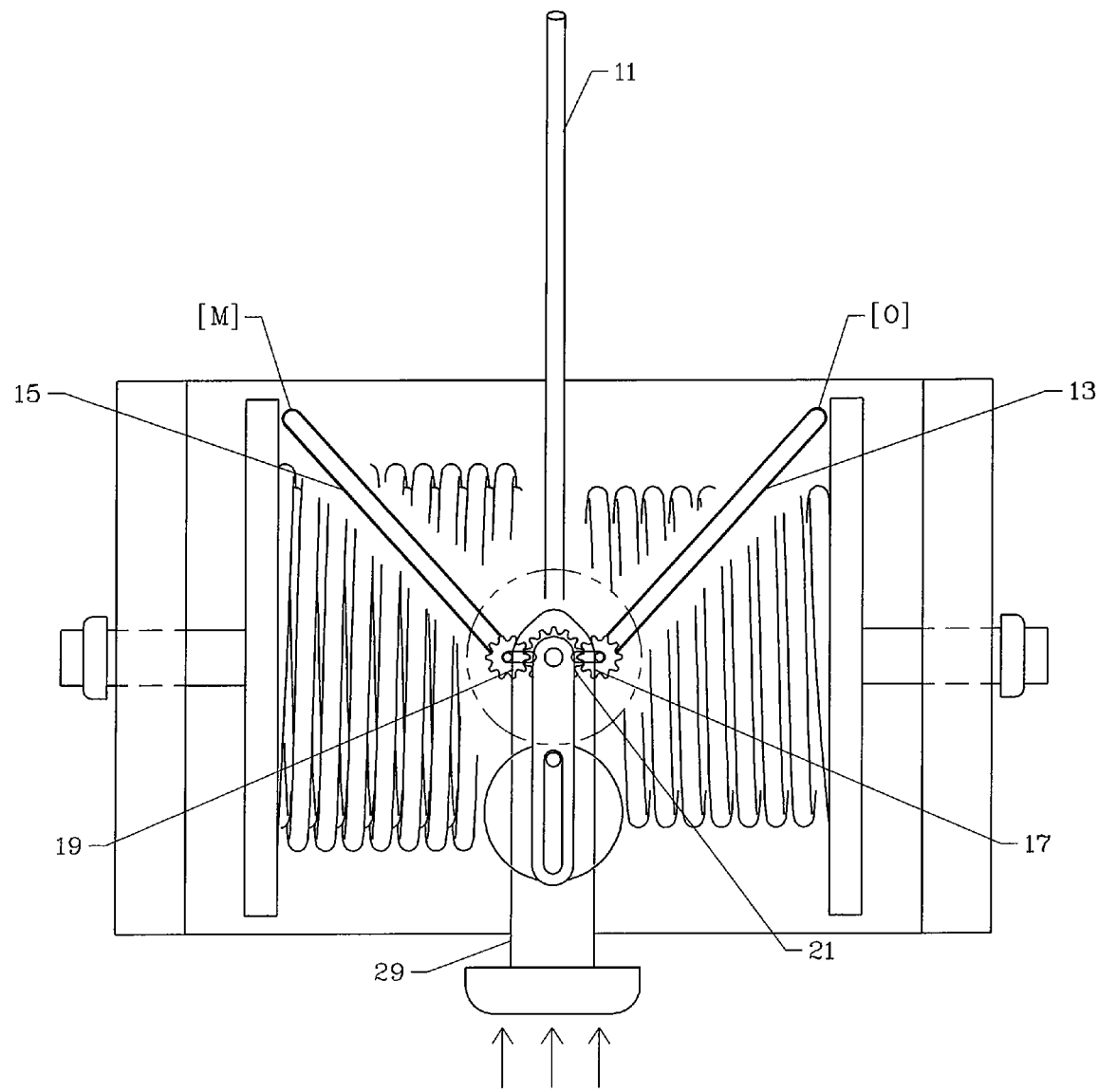
FIG. 8 is a top view of the present invention showing the pivot switch mechanism illustrated in FIG. 7 activated to shift the line guides to the line dispensing position

In FIG. 8, the pivot switch 29 has been activated, causing gear 21, which is drivingly connected to gear 17 and gear 19, to push gears 17 and 19 further away from each other in opposite directions. Gear 21 does not revolve as the pivot switch 29 is being activated, thus the driving connection it maintains between gears 17 and 19 causes gears 17 and 19 to revolve about their axes in equal but opposite directions as pivot switch 29 is activated. Further, because line guide 13 is attached to gear 17 and line guide 15 is attached to gear 19, line guides 13 and 15 will rotate in equal but opposite directions until they reach positions M and O respectively. When line guides 13 and 15 reach positions M and O, they have been shifted to a position near the opposite axial ends of the spool 5 (generally located non-disposed within the spool 5) so that they do not interfere with the line 11 and the line 11 can be dispensed from the spool 5 with no interference by the level-wind mechanism.

Figure 8A:
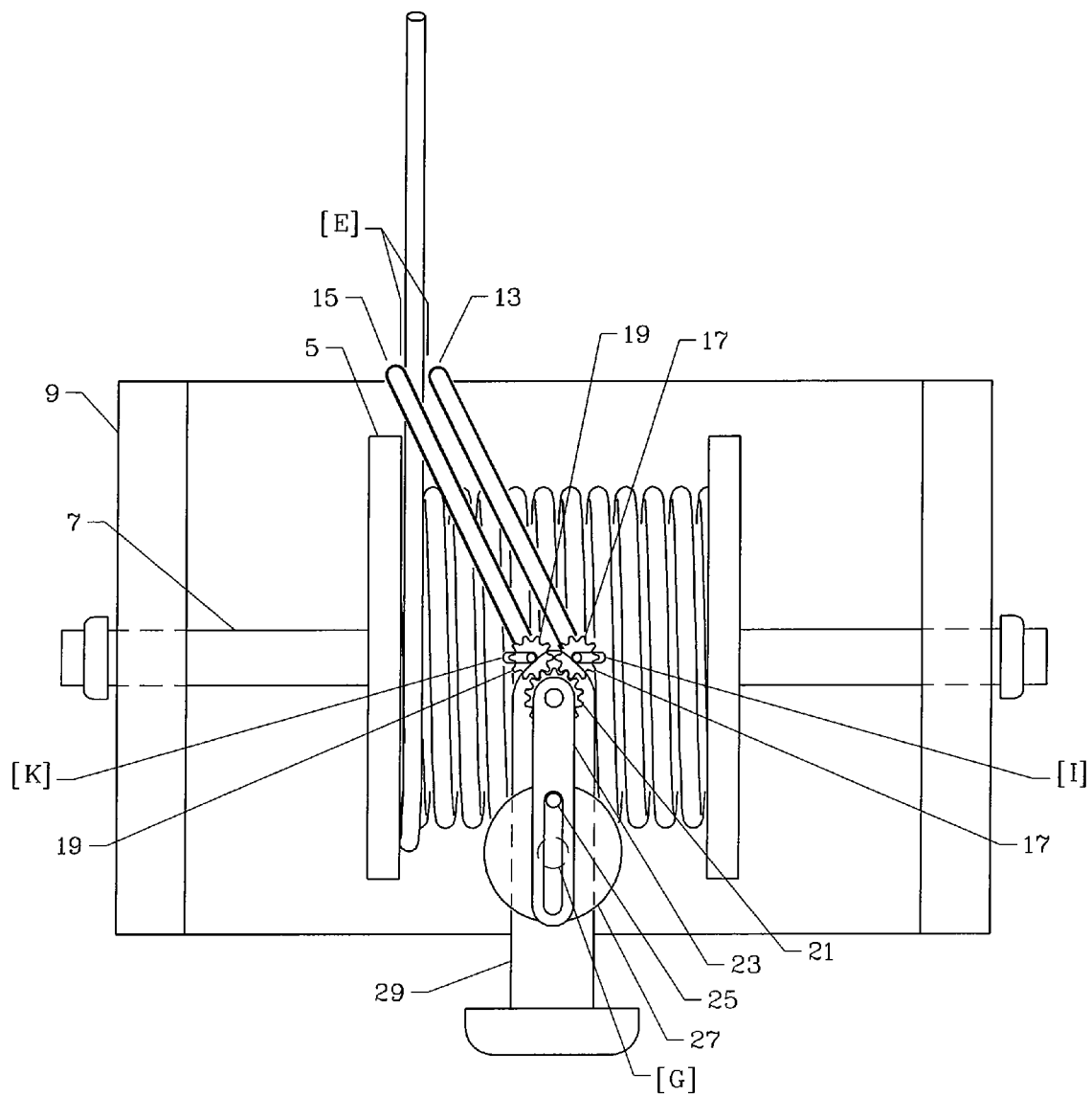
FIG. 8A is a top view of the present invention showing the pivot switch mechanism illustrated in FIG. 7, but with the line guides oscillated to one axial end of the spool

FIG. 8A is similar to FIG. 7, but in this example, the line guides 13 and 15 have been oscillated to the left-hand axial edge of the spool 5 under the motive force as described herein (description of FIG. 6). The line guide pivot switch 29 is equally effective at pivoting the line guides 13 and 15 to the line 11 disseminating position no matter to what degree of oscillation along the axial length of the spool 5 the line guides 13 and 15 are currently residing.

Figure 8B:
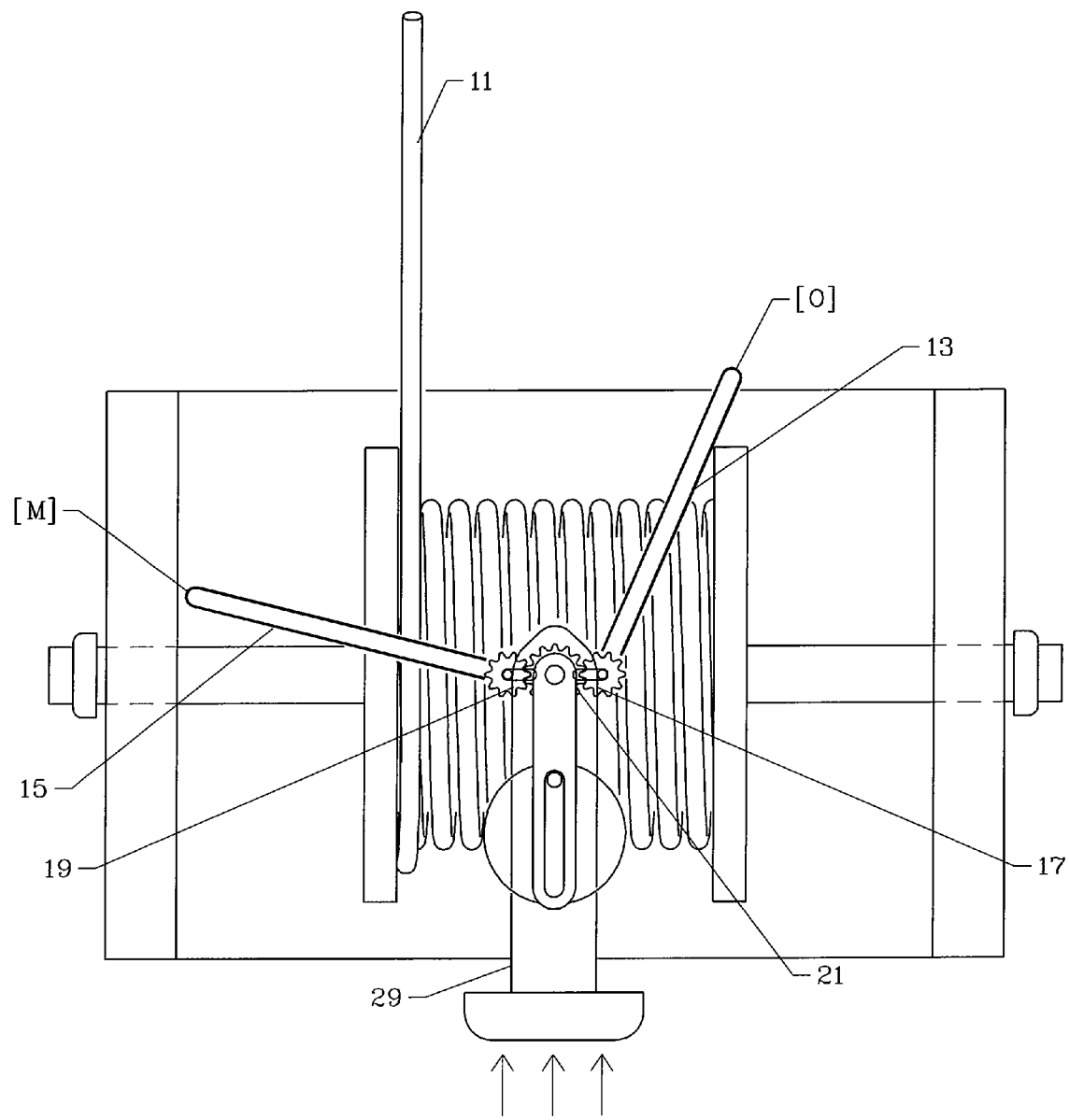
FIG. 8B is a top view of the present invention showing the pivot switch mechanism illustrated in FIG. 8 activated to shift the line guides that were oscillated to one axial end of the spool to the line dispensing position

In FIG. 8B, the pivot switch 29 has been activated, causing gear 21, which is drivingly connected to gear 17 and gear 19, to push gears 17 and 19 further away from each other in opposite directions. Gear 21 does not revolve as the pivot switch 29 is being activated, thus the driving connection it maintains between gears 17 and 19 causes gears 17 and 19 to revolve about their axes in equal but opposite directions as pivot switch 29 is activated. Further, because line guide 13 is attached to gear 17 and line guide 15 is attached to gear 19, line guides 13 and 15 will rotate in equal but opposite directions until they reach positions M and O respectively. When line guides 13 and 15 reach positions M and O, they have been shifted to a position near the opposite axial ends of the spool 5 (generally located non-disposed within the spool 5) so that they do not interfere with the line 11 and the line 11 can be dispensed from the spool 5 with no interference by the level-wind mechanism.

FIG. 9 is a detailed top view of the section shown in FIG. 8. In FIG. 9, spring 31 is activated as the pivot switch 29 is activated and the axis of gears 17 and 19 are pushed further away from each other in a longitudinal direction. Thus, spring 31 maintains a continuous driving connection between gears 21, 17, and 19 at all times even while the gears 17 and 19 are being displaced farther apart by gear 21. Spring 31 also returns gears 17 and 19 to their original position as pivot switch 29 is deactivated.

As previously explained, the motive force responsible for oscillating the line guides 13 and 15 from one axial end of the spool 5 to the other can be imparted to any of the level-wind components in the configuration. In FIG. 10, for example, the motive force for the level-wind mechanism imparts its force to gear 22 rather than to gear 21 as described in FIG. 6. Cam 25 is attached to and protrudes from the surface of rotating member 27 (which as explained earlier can receive its revolutionary force via any method) which revolves about an axis at position G. Cam follower 23 is drivingly engaged with cam 25 so that as rotating member 27 revolves about its axis G, cam follower 23 pivots about the axis of gear 22. The center of pivot of cam follower 23 has a raised cam on its top face (Position H) that is drivingly engaged with cam follower 18 so that cam follower 18 becomes the axis of rotation for line guide 15. Gear 22 has an integrated axle (shaft) so that spring 20 is threaded onto the shaft of gear 22, and the terminal end of the shaft of gear 22 is threaded through the pivot axis of cam follower 23 and finally rigidly affixed to cam follower 18. Gear 21 is drivingly engaged to gear 22 and to gear 17, so that as cam follower 23 pivots gear 22 about its axis, gear 17 (and thus line guide 13 which is attached to gear 17) will pivot in unison. The assembly of components 15, 18, 20, 22, and 23 work in concert as a compliance device that is capable of eliminating failure of the level wind components as described in this invention, prevents failure of the various engagement/disengagement devices described in the prior art, prevents failure of the supporting structure(s), and is even capable of preventing failure of the of the line 11. For example, with the inclusion of the compliance device of the present invention, if the line 11 is being wound upon the spool 5 under a force that is greater than what the level-wind components can safely handle, cam follower 18 (and thus line guide 15) can shift about their axis of rotation. When cam follower 18 shifts about its axis, the inclined plane cam areas of cam 23 (at Position H) causes cam follower 18 to rise vertically (move upward in the perspective of FIG. 10). As cam follower 18 shifts about its axis and rises vertically, it causes spring 20—which is sandwiched between gear 22 and cam follower 23—to compress. In this manner, line guide 15 is permitted to pivot or flex to either side (and thereby lower the overall forces acting against the level-wind components) if the force of the line 11 is greater than the compressive force of spring 20. Likewise, because gear 22 is drivingly engaged with gear 21, and gear 21 is drivingly engaged with gear 17 (which is rigidly affixed to line guide 13), a line 11 force that is greater than the compressive force of spring 20 acting on line guide 13 will allow line guide 13 to pivots or flex in order to reduce the overall forces acting against these components. The opposite is true as the force on the line 11 decreases, which causes cam follower 18 (and thus line guides 15 and 13) to pivot back to their original positions as the compressive force of spring 20 is released.

Figure 10A:
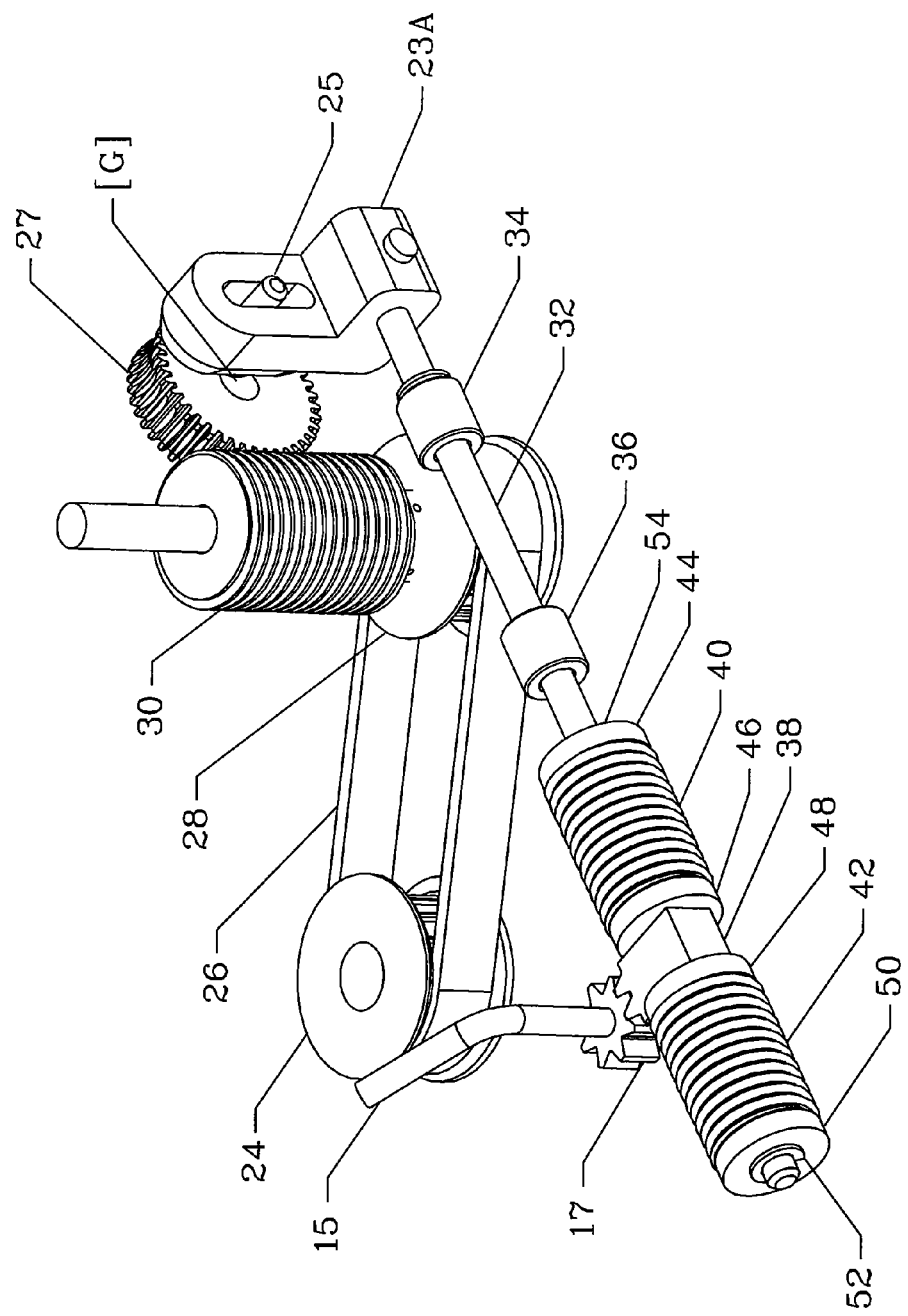
FIG. 10A is a frontal perspective of the present invention showing a motive force attached to a line guide and a second example of a mechanical compliance device

FIG. 10A illustrates a second example of incorporating a compliancy device within the present invention. In FIG. 10A, a motive force is imparted to the level-wind mechanism through a combination of belts and pulleys, so that the revolution of pulley 24 is being driven by an external force and pulley 24 imparts a rotational force to belt 26. Belt 26 is drivingly engaged with pulley 28 so that belt 26 imparts a rotational force to pulley 28 for causing it to revolve about its axis. Gear 30 is rigidly affixed to the axis of pulley 28, so that gear 30 revolves in unison with pulley 28 under the applied motive force. Cam 25 is attached to and protrudes from the surface of rotating member 27. Rotating member 27 is drivingly engaged with Gear 30, so that it receives a rotational force from gear 30 (which is driven by belt 26 and pulleys 24 and 28) for causing it to revolve about an axis at position G. Cam follower 23A is drivingly engaged with cam 25 so that as rotating member 27 revolves about its axis G, cam follower 23A is guided back and forth in concert with cam 25. Because rod member 32 is rigidly affixed to cam follower 23A, and supported by supports 34 and 32, rod member 32 slides in concert with cam follower 23A as the cam follower 23A is pushed by cam 25 from one side of rotating member 27 to the other side of rotating member 27. The bore of gear 38 is threaded onto rod member 32 and positioned between springs 40 and 42 which are located on opposing sides of gear 38. Springs 40 and 42 are supported about rod member 32 at each end by spacer supports 44, 46, 48, and 50. Finally, spacer 50 and spacer 54 are laterally restrained along rod member 32 by clips 52 and 54. Finally, gear 17 is affixed to either line guide 15 (or line guide 13—not shown), and gear 17 is drivingly engaged with gear 38, so that as rod member 32 is slid from one side to the other (by the motive force of cam 25 and cam follower 23A), gear 38 causes gear 17 (and thus, line guide 15) to revolve back and forth about its axis.

The assembly of aforementioned components work in concert as a compliance device that is capable of eliminating failure of the level wind components as described in this invention, prevents failure of the various engagement/disengagement devices described in the prior art, prevents failure of the supporting structure(s), and is even capable of preventing failure of the line 11. For example, with the inclusion of the compliance device of the present invention, if the line 11 is being wound upon the spool 5 under a force that is greater than what the level-wind components can safely handle, gear 17 (and thus line guide 15) can shift about its axis of rotation. When gear 17 and line guide 15 shifts about their axis of rotation, gear 38 (because it is drivingly engaged with gear 17) is pushed along rod member 32. As gear 38 is pushed along rod member 32, the spring 40 or 42 to the side toward which gear 38 is being pushed is activated (or compressed). Likewise, as the force upon the line 11 diminishes, line guide 15 (and thus gear 17) will pivot back to its equilibrium position as the compressive forces of the spring (either 40 or 42) are released. In this manner, line guide 15 is permitted to pivot or flex to either side (and thereby lower the overall forces acting against the level-wind components) if the force of the line 11 is greater than the compressive forces of either spring 40 or 42.

Figure 10B:
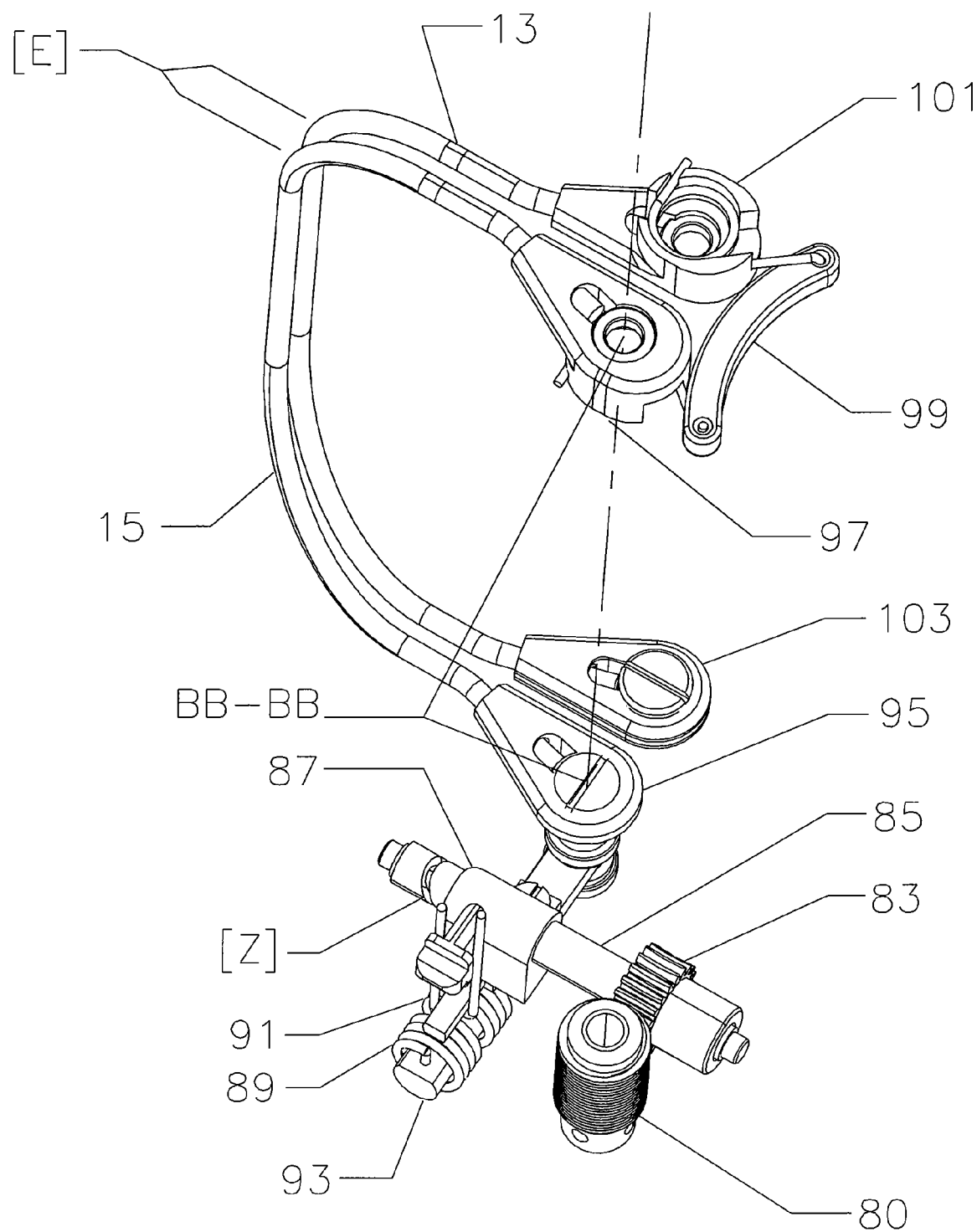
FIG. 10B is a frontal perspective of the present invention showing a motive force attached to a line guide and a third example of a mechanical compliance device with the line guides positioned in the line guiding position

FIG. 10B illustrates a third example of incorporating a compliancy device within the present invention. In FIG. 10B, a motive force is imparted to the level-wind mechanism through the revolution of gear 80 which is driven by an external force. The revolution of gear 80 imparts a rotational force to gear 83. Gear 83 is drivingly engaged with cam shaft 85, so that the revolution of gear 83 causes the cam shaft 85 to revolve about its axis. Cam follower 87 is in driving communication with cam shaft 85 so that when cam shaft 85 is in operation, it causes cam follower 87 to slide linearly across cam shaft 85. The cam surface [Z] on cam shaft 85 loops back upon itself at each end in an infinite pattern. Thus, cam shaft 85 comprises a self-actuation switch that reverses the direction of travel of the cam follower 87 so that it oscillates back and forth across cam shaft 85. The centers of truss 95 and truss 97 form the axis of rotation BB-BB for level-wind wire 15. Rod member 93 is rigidly fastened to truss 95, and one end of each of two springs 89 and 91 are connected to rod member 93. The other end of the two springs 89 and 91 are in contact with cam follower 87. So, as cam follower 87 slides back and forth across cam shaft 85, the springs 89 and 91 cause rod member 93 to pivot back and forth about the axis of rotation BB-BB. And, because level-wind wire 15 is fastened to truss 95 which is attached to rod member 93, level-wind wire 15 oscillates back and forth about the axis of rotation BB-BB as gear 80 receives its motive force. Truss 97 is rigidly attached to the top of level-wind wire 15 so that as level-wind wire 15 oscillates back and forth about the axis of rotation BB-BB, truss 97 also oscillates back and forth about the axis of rotation BB-BB. An extension of truss 97 is attached to one end of lever arm 99, while the opposite end of lever arm 99 is attached to an extension of truss 101. Thus, the oscillation of truss 97 about axis of rotation BB-BB causes lever 99 to exert an equal oscillation upon truss 101. And further, because truss 101 is rigidly attached to the top of level-wind wire 13, level-wind wire 13 will oscillate in unison with level-wind wire 15 as gear 80 receives a motive force. Thus the line 11 that is captured within slot [E] is guided back and forth across the width of the spool as level-wind line guides 13 and 15 pivot back and forth across their axis of rotation.

In this example, the assembly of the aforementioned components work in concert as a compliance device that is capable of eliminating failure of the level wind components as described in this invention, prevents failure of the various engagement/disengagement devices described in the prior art, prevents failure of the supporting structure(s), and is even capable of preventing failure of the line 11. For example, with the inclusion of the compliance device of the present invention, if the line 11 is being wound upon the spool 5 under a force that is greater than what the level-wind components can safely handle, spring 89 or 91 are capable of flexing to one side or the other about rod member 93, thereby causing rod member 93 (and ultimately level-wind wires 13 and 15) to pivot about the axis of rotation BB-BB so that the overall forces on the system are reduced. Thus, in this manner, line guides 13 and 15 are permitted to pivot or flex to either side (and thereby lower the overall forces acting against the level-wind components) if the force of the line 11 is greater than the compressive forces of either springs 89 or 91.

Because the level-wind guides 13 and 15 are generally in the shape of a half circle (with their outer perimeter's extending radially beyond their axis of pivot (about axis BB-BB)) and because the level-wind guides 13 and 15 remain in driving contact at all times as they traverse the axial length of the spool 5 in the line 11 retrieve position (first position), and throughout their entire range of pivot to a second position of line 11 dissemination, the present invention is able to incorporate a compliancy device where level-wind mechanisms described in the prior art are not.

It should be noted, that while the compliance devices illustrated in FIG. 10, FIG. 10A, and FIG. 10B are accomplished using a combination of cams, cam followers, gears, springs, supports, levers, etc., the compliance device within the system could also be achieved in numerous other methods (for example, building cam follower 23 of a pliant material, incorporating springs between the driving structures so that they do no longer drive each other under higher forces, building compliancy (capability to flex or bend) into the line guides 13 and 15 themselves, etc.) and the design and/or sequence of the such a device may vary without straying from the purview of the present invention.

As shown in these examples, a motive force allows the guides 13 and 15 to pivot back and forth about a single pivot point in order to distribute the line 11 on the spool 5 rather than being required to shift back and forth parallel to the axis of the spool 5, in order to distribute the line 11 on the spool 5. The line 11 guides 13 and 15 can be selectively repositioned from the line 11 retrieval position (first position) to the line 11 dissemination position (second position) without first having to be disengaged from, or reconnected to their motive force. Also a compliance mechanism is provided.

In summary, the invention provides for at least one guide 13 and 15 for distributing the line 11 onto a spool 5 that is being revolved about an axis in order to retrieve a line 11 wherein the guide 13 and 15 is pivotally connected to a supporting structure. The pivot connection defines an axis of pivot. The outer perimeter of the line 11 guide 13 and 15 is disposed outside of the axis of pivot. The line 11 guide 13 and 15 can be selectively pivoted between a first position and a second position wherein the orientation of the line 11 guide 13 and 15 in the first position is generally disposed within the spool 5; wherein the orientation of the line 11 guide 13 and 15 in the second position is generally non-disposed within the spool 5.

A motive force is provided for causing the line 11 guide 13 and 15 to pivot about the pivot connection of the supporting structure. The line 11 guide 13 and 15 can be selectively pivoted between a first position and a second position: wherein the orientation of the line 11 guide 13 and 15 in the first position is generally disposed within the spool 5; and wherein the orientation of the line 11 guide 13 and 15 in the second position is generally non-disposed within the spool 5.

A pivot mechanism is provided for causing the line 11 guide 13 and 15 to be selectively pivoted between the first position and the second position. The pivot connection defines an axis of pivot. The outer perimeter of the line 11 guide 13 and 15 is disposed outside of the axis of pivot. The line 11 guide 13 and 15 remains in driving contact with its motive force during the selective pivot from the first position to the second position. The guide 13 and 15 remains in driving contact with the pivot mechanism during the selective pivot from the first position to the second position.

One embodiment of the invention can also be generally described to include at least one guide 13 and 15 for distributing the line 11 onto a spool 5 that is being revolved about an axis in order to retrieve a line 11, comprising: a supporting structure 70 or 72 wherein the guide 13 and 15 is pivotally connected to the supporting structure 70 or 72; the spool 5 is supported by the supporting structure 70 at only one location; and the spool 5 is not supported by the supporting structure 70 at terminal end. The pivot connection defines an axis of pivot. The outer perimeter of the guide 13 and 15 is disposed outside of the axis of pivot. The guide 13 and 15 can be selectively pivoted about the axis of pivot of the supporting structure 70 or 72 to a second position wherein the second position allows the line 11 to be dispensed from the terminal end of the spool 5.

Moreover, the invention can also be generally described to include at least one guide 13 and 15 for distributing the line 11 onto a spool 5 that is being revolved about an axis in order to retrieve the line 11, comprising: a supporting structure wherein the guide 13 and 15 is pivotally connected to the supporting structure; and a motive force for causing the guide 13 and 15 to pivot about the pivot connection of the supporting structure. The guide 13 and 15 can be selectively pivoted between a first position and a second position, wherein the orientation of the guide 13 and 15 in the first position is generally disposed within the spool 5; wherein the orientation of the guide 13 and 15 in the second position is generally non-disposed within the spool 5. A pivot mechanism is provided for causing the guide 13 and 15 to be selectively pivoted between the first position and the second position. The pivot connection defines an axis of pivot and the outer perimeter of the guide 13 and 15 is disposed outside of the axis of pivot. The guide 13 and 15 remains in driving contact with its motive force during the selective pivot from the first position to the second position. The guide 13 and 15 incorporates a compliance mechanism to prevent mechanical failure of the various described components including the motive force, the guide 13 and 15, the pivot mechanism, etc.

The invention can also be generally described as a method for selective line 11 retrieval and line 11 dissemination. In a spool 5 that is being revolved about an axis in order to retrieve a line 11, with at least one guide 13 and 15 for distributing the line 11 comprising a supporting structure wherein the guide 13 and 15 is drivingly engaged to a motive force, wherein the guide 13 and 15 is pivotally connected to the supporting structure, wherein the pivot connection of the supporting structure defines an axis of pivot, wherein the outer perimeter of the guide 13 and 15 is disposed outside of the axis of pivot, wherein the guide 13 and 15 incorporates a pivot mechanism, the method includes (a) orienting the guide 13 and 15 in a first position generally disposed within the spool 5; (b) Pivoting the guide 13 and 15 about the pivot axis so that the line 11 is guided upon the spool 5 during retrieval; (c) Activating the pivot mechanism to orient the guide 13 and 15 to a second position generally non-disposed within the spool 5; (d) Dispensing the line 11 from the spool 5; (e) Orienting the guide 13 and 15 from the second position of line 11 dispensing back to the first position of line 11 guiding (f) Wherein steps (a) through (e) do not require a disengagement of the guide 13 and 15 from the motive force; (g) Wherein steps (a) through (e) do not require a disengagement of the guide 13 and 15 from the pivot mechanism.

SECOND EXAMPLE

Figure 11:
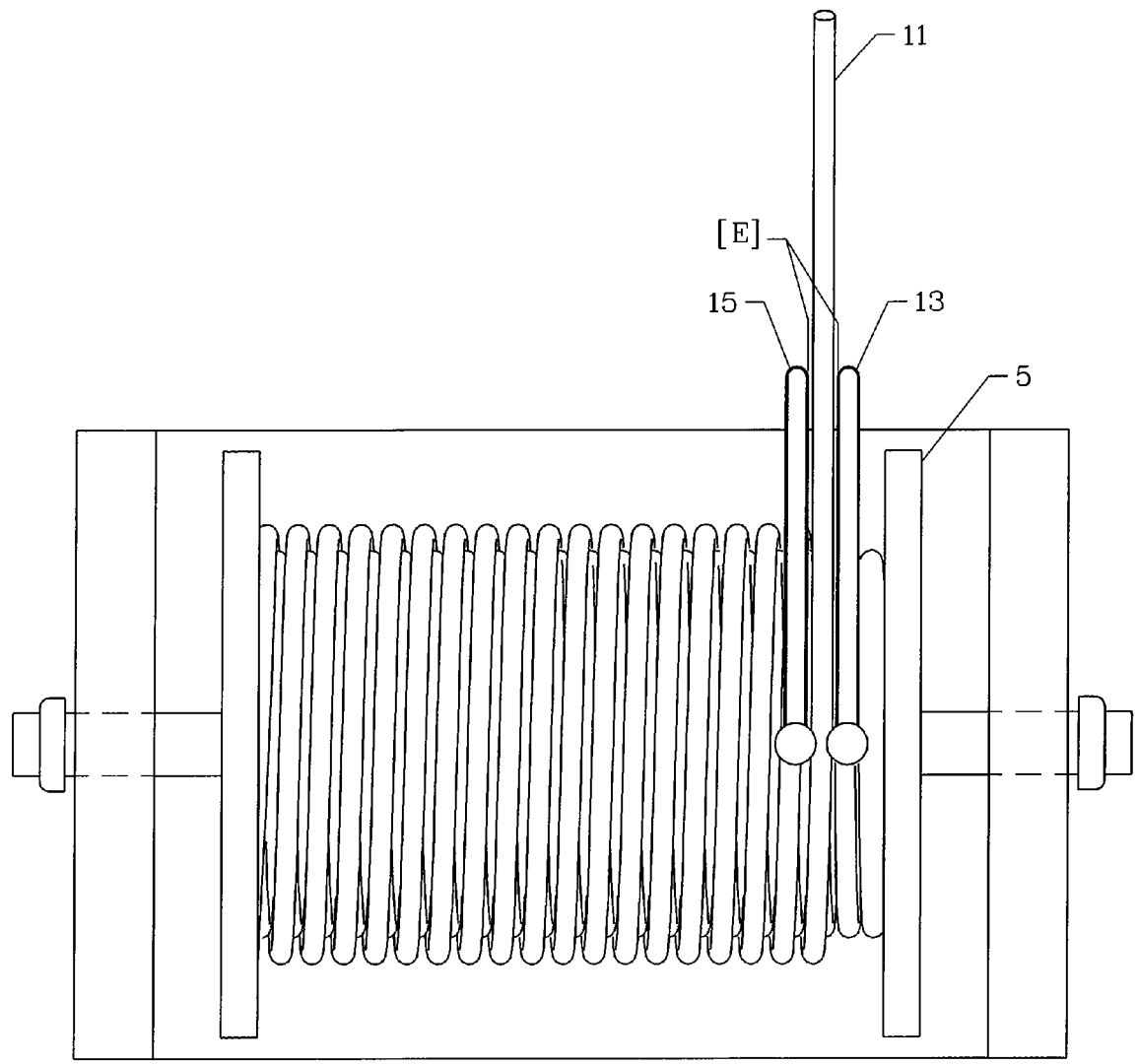
FIG. 11 is a top view of the present invention with the line guides positioned in the line guiding position and line guides oscillated to the right-hand axial edge of spool via linear motion

FIG. 11 is a second example of a top view of the present invention with the line guides 13 and 15 pivoted together to form the line guide slot E and showing the line guides 13 and 15, and thus the line 11 oscillated to the right-hand axial edge of the spool 5.

Figure 12:
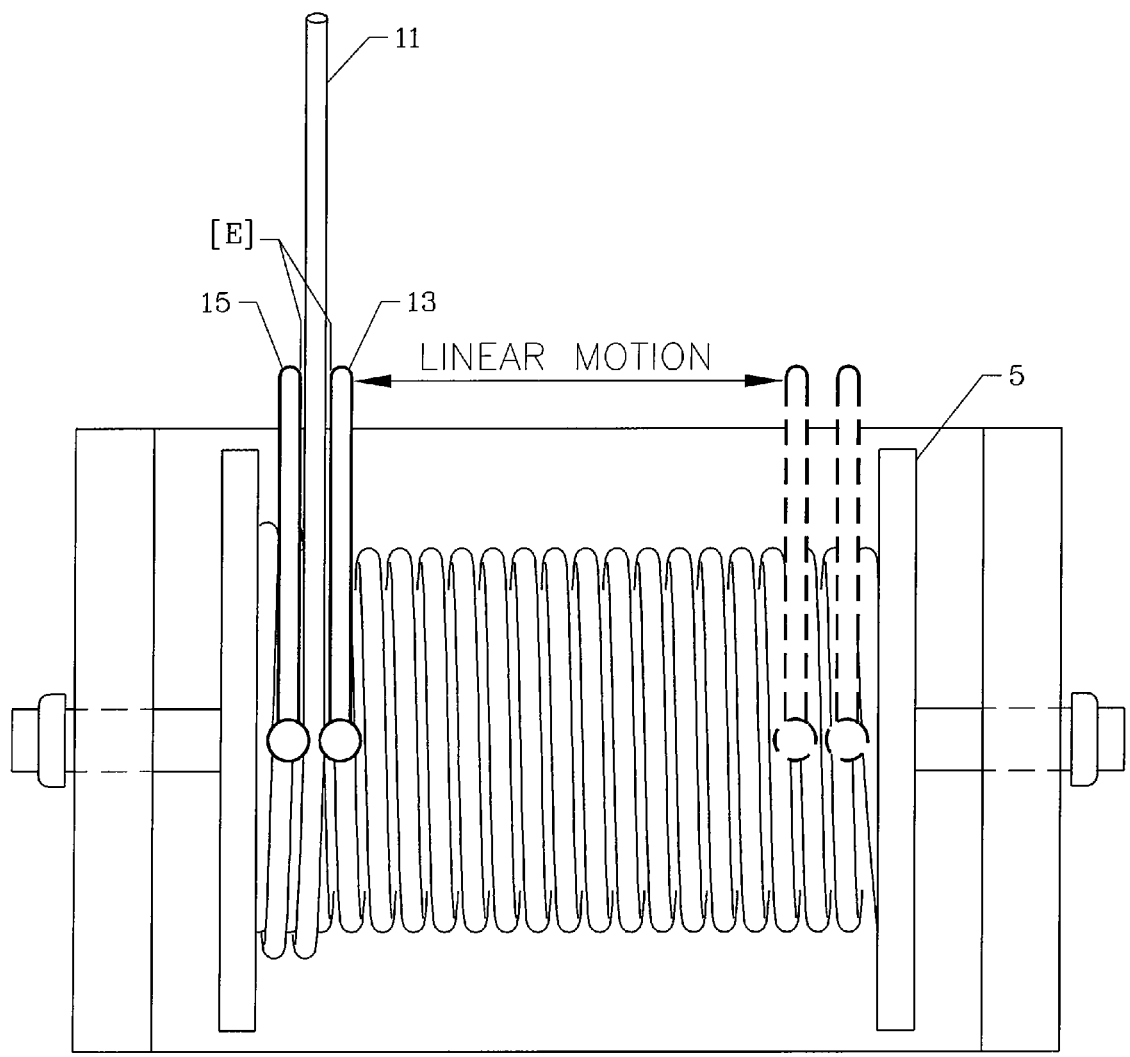
FIG. 12 is a top view of the present invention with the line guides positioned in the line guiding position and line guides oscillated to the left-hand axial edge of spool via a linear motion

FIG. 12 is a top view of the second example of the present invention with the line guides 13 and 15 pivoted together to form the line guide slot E and showing the line guides 13 and 15, and the line 11 oscillated back to the left-hand axial edge of the spool 5. In the second example, the line guides 13 and 15 are pivotally connected to any linear motion device, such that the line guide slot E that is formed between the line guides 13 and 15, travels from the right-hand axial edge of the spool 5 to the left-hand axial edge of the spool 5 (and vice versa) following a linear path. Because the line 11 is captured within the line guide slot E, the line 11 travels from the right-hand axial edge of the spool 5 to the left-hand axial edge of the spool 5 in concert with the line guide slot E.

Figure 13:
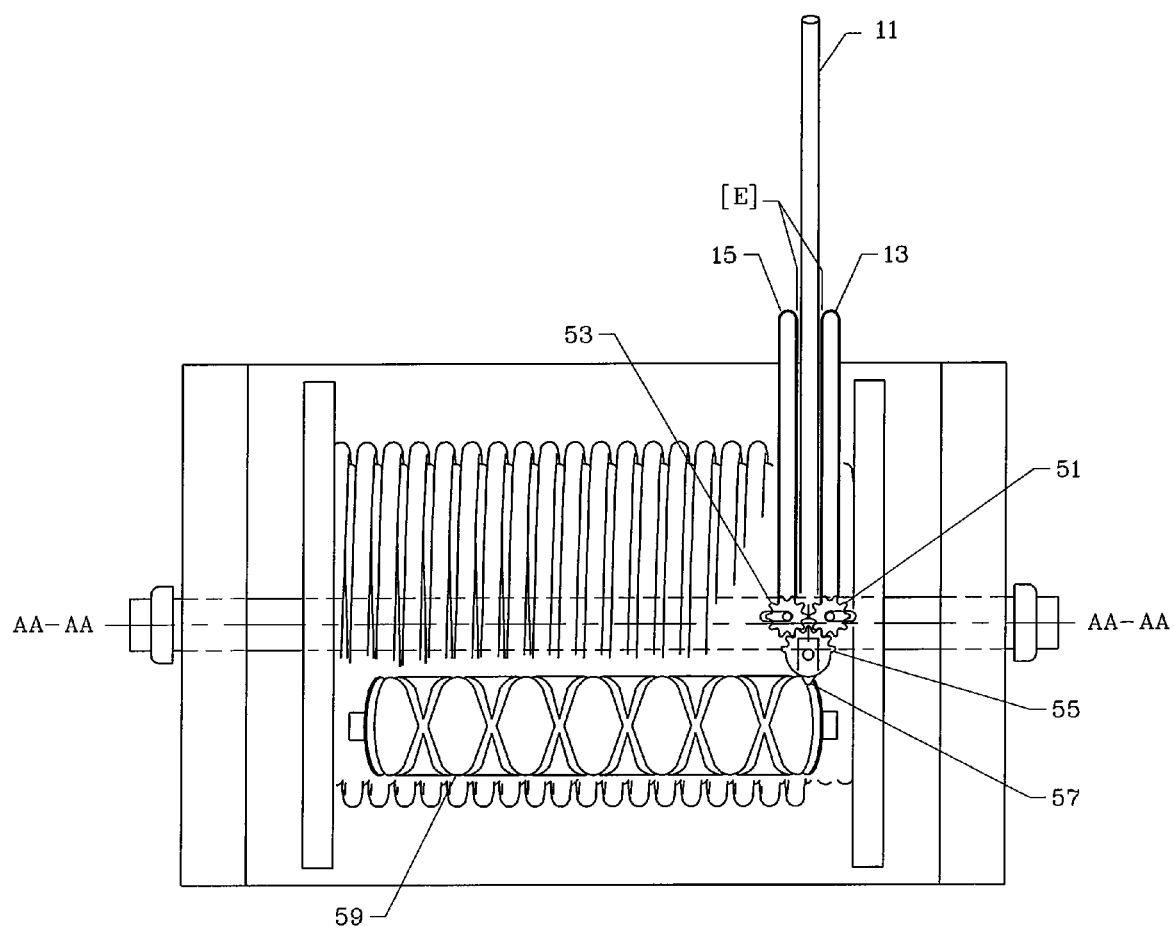
FIG. 13 is a top view of one example of the present invention with linear motive force for line-guide oscillation derived from a cam

FIG. 13 illustrates one example of how the line guides 13 and 15 receive a motive force in order to shift from left to right and from right to left in an oscillatory fashion. In this example, gear 51 is affixed to line guide 13 and gear 53 is affixed to line guide 15. Gear 51 and gear 53 are not in driving contact, but both gear 51 and gear 53 are in driving contact with gear 55. Gear 55 has a cam follower 57 that pivotally disposed within gear 55 so that the follower 57 is free to revolve within gear 55 to match the movement of the cam 59 to which it is engaged. The spool chassis 9 rotatably supports Cam 59. The tip of cam follower 57 is drivingly engaged within the continuous and symmetric helical or criss-crossed grooves that are cut into the circumference of cam 59 such that when cam 59 revolves under any motive force, the cam follower 57 is guided across the entire axial length of the spool 5 from left to right and vice versa. In this example, the motive force for the cam 59 can be exerted by any mechanism including an electric motor, manual crank, gear drive, chain drive, belt drive, rope drive, slew drive, winch or winch drive, crawler drive, wheel drive, drive link, aerator drive, pump drive, hydraulic drive, electric drive, or any arrangement of lever arms, belts, pulleys, sprockets, cables, cords, springs, cams, rollers, wheels, magnetic devices, linear actuators, racks, rails, sensors, switches, clutches, hydraulic devices, electrical devices, gears, chains, shafts, etc., and the design and/or sequence of the motive force which drives the rotating member 59 may vary without straying from the purview of the present invention. Because the helical grooves about the circumference of the cam 59 contain closed loops at each end, and because cam follower 57 is drivingly engaged with the Gear 55, which in turn is drivingly engaged with gears 51 and 53, which in turn are affixed to line guides 13 and 15, one pass of cam follower 57 causes one pass of the line guide slot E, and thus the line 11 from the left hand axial edge of the spool 5 to right hand axial edge of the spool 5, and back again or vice versa. Thus, this example of the present invention also includes a self-actuation switch that reverses the direction of travel of line guides 13 and 15 once the axial ends of the spool 5 are reached. Thus, during operation, the line guide slot E moves in an oscillatory translational fashion and is capable of wrapping the line 11 upon the spool 5 in an even and orderly fashion.

Figure 14:
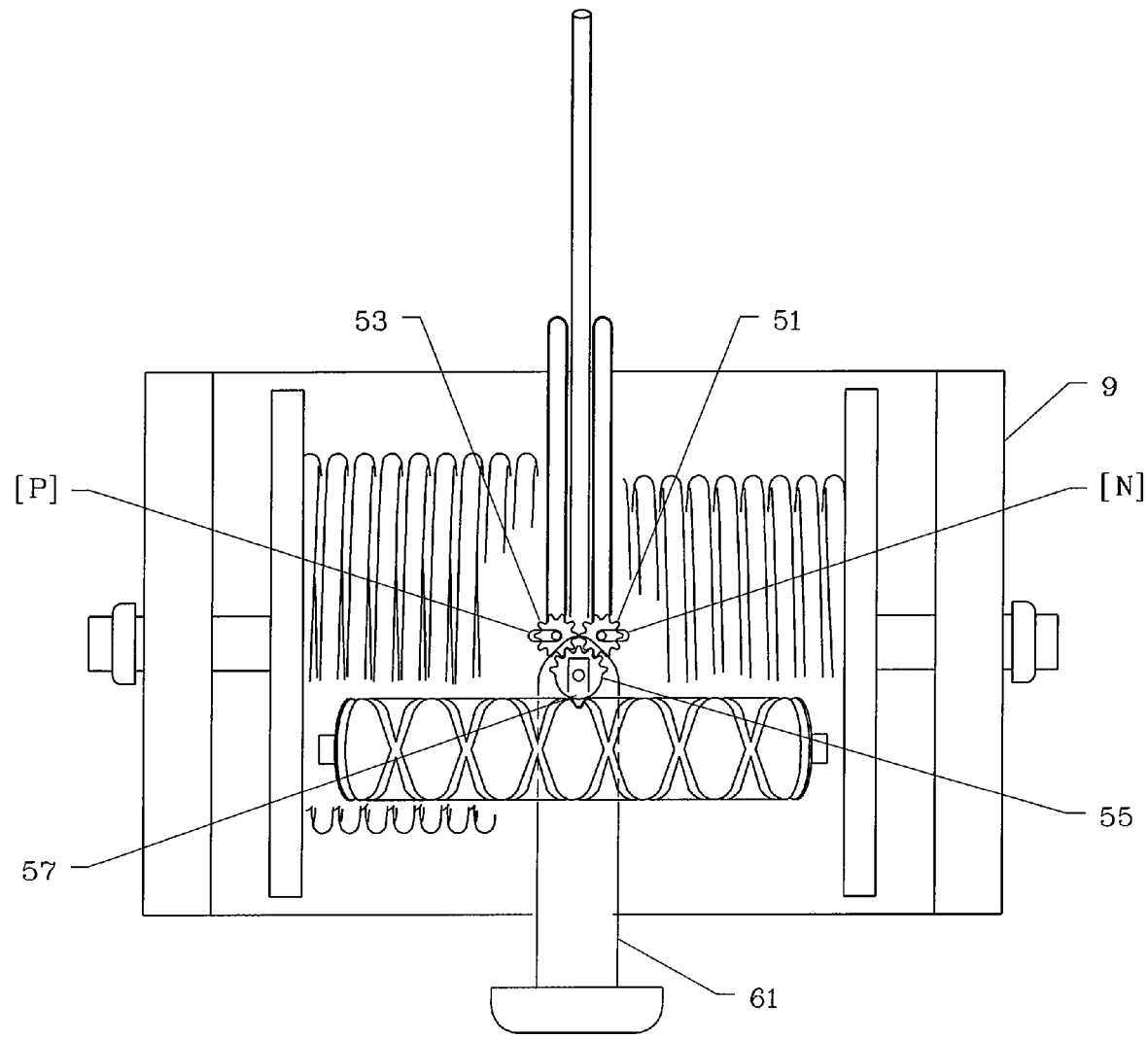
FIG. 14 is a top view of the present invention illustrating one example of a line guide pivot switch mechanism for the linear line-guide oscillation derived from a cam as illustrated in FIG. 13

FIG. 14 is a top view of the present invention illustrating one possible example of a line guide pivot switch 61 for the motive force as described in FIG. 13. Gear 55 is rigidly affixed to the pivot switch, and thus, so is cam follower 57. Cam follower 57 is under a compressive force (for example via spring force (spring not shown)) within its cavity in gear 55, so that when the line guide pivot switch 61 is activated, cam follower 57 pushes out of its cavity and is able to maintain its driving engagement with cam 59 at all times whether the line guide pivot switch 61 is in the activated position or the un-activated position.

The axle of revolution of gear 51 and gear 53 are operably connected to each other by a spring 31 (detailed in FIG. 9), and the axles of revolution of gears 51 and 53 are confined to horizontal slots (Position N and P) in the spool support chassis 9 such that their axis of revolution are limited to moving further away from each other in an axial direction only.

Figure 15:
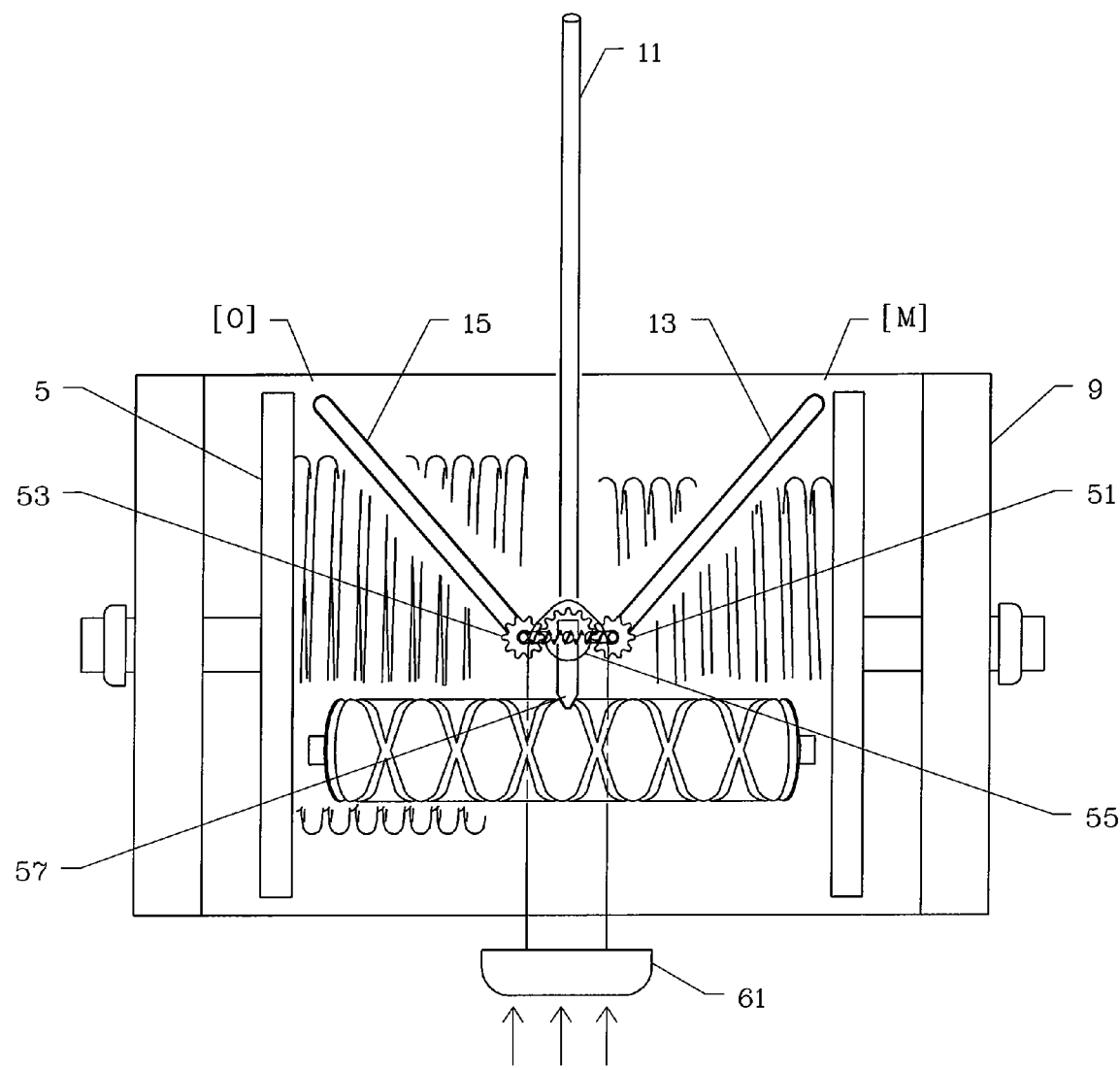
FIG. 15 is a top view of the present invention showing pivot switch mechanism illustrated in FIG. 14 activated to shift the line guides to the line dispensing position

FIG. 15, the pivot switch 61 has been activated, causing gear 55, which is drivingly connected to gear 51 and gear 53, to push gears 51 and 53 further away from each other in an axial direction. The spring 31 is activated as the pivot switch 61 is activated and the axis of gears 51 and 53 are pushed further away from each other in an axial direction, thus, spring 31 maintains a continuous driving connection between gears 55, 51, and 53 at all times even while the gears 51 and 53 are being displaced farther apart by gear 55. Spring 31 also returns gears 51 and 53 to their original position as pivot switch 61 is deactivated.

Gear 55 does not revolve as the pivot switch 61 is being activated, thus the driving connection it maintains between gears 51 and 53 causes gears 51 and 53 to revolve in equal but opposite directions as the pivot switch 61 is being activated. Further, because line guide 13 is attached to gear 51 and line guide 15 is attached to gear 53, line guides 13 and 15 will rotate in equal and opposite directions until they reach the positions M and O respectively. In these positions (M and O) line guides 13 and 15 have been shifted to from a first position of line 11 retrieval to a second position of line 11 dissemination near the opposite axial ends of the spool 5 (generally non-disposed within the spool 5) so that they do not interfere with the line 11 and the line 11 can be dispensed from the spool 5 with no interference by the level-wind mechanism.

Figure 16:
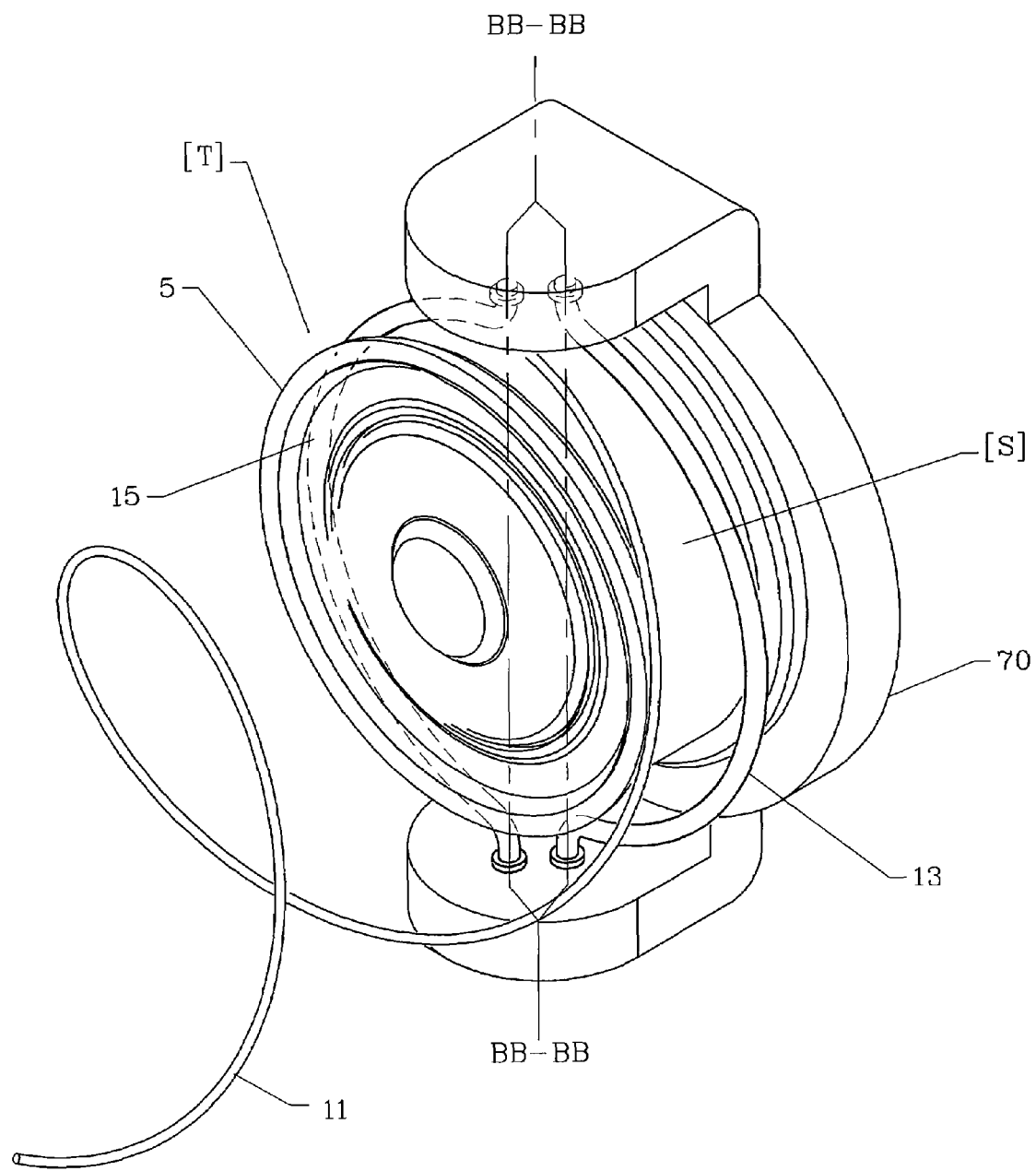
FIG. 16 is a frontal perspective of the present invention with the spool supported on a single end and the line guides shifted to opposite sides of the spool in order to allow the line to be dispensed from the open end of the spool

It is a further intention of the present invention to provide a means to enable the line 11 that has been wound upon the spool 5 to be paid out again without the requirement that the spool 5 revolve in a direction counter to that of line 11 retrieval. This is accomplished by supporting the spool 5 from only one side as demonstrated in FIG. 16. Just like the present invention as described in FIGS. 1-15, the level-wind mechanism depicted in FIG. 16 is equally adept at wrapping the line 11 upon the spool 5 in an even and orderly fashion. But, by supporting the spool 5 by the spool support chassis 70 on only a single side and shifting (about axis BB-BB) the line guides 13 and 15 to a second position on opposite sides of the spool 5 (at positions S and T), the line 11 is capable of being dispensed over the unsupported and open end of the spool 5.

Figure 17:
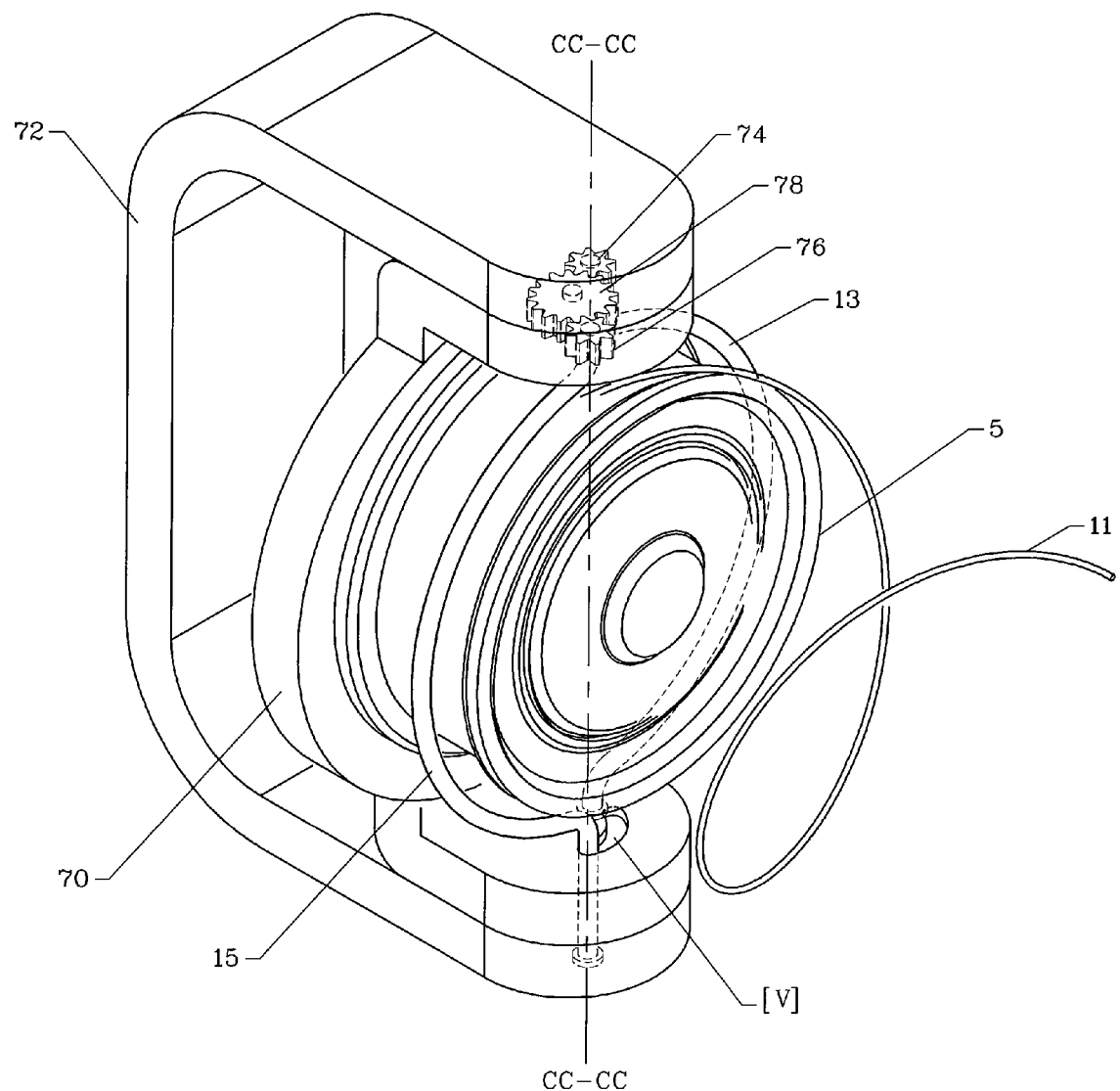
FIG. 17 is a frontal perspective of the present invention with the spool supported on a single end and line guides shifted to the line dispensing position and the spool also pivoted to allow the line to be dispensed from the open end of the spool

FIG. 17 depicts a similar scenario whereby the spool 5 is supported on a single side by the spool support chassis 70, but in this example, the spool 5 (or the combination of the spool support chassis 70 and the spool 5) is rotatably affixed to a second support chassis 72. The second support chassis 72 allows the spool 5 (or the combination of the spool support chassis 70 and the spool 5) to pivot about axis CC-CC in order to facilitate the means to enable the line 11 that has been wound upon the spool 5 to be paid out again without the requirement that the spool 5 revolve in a direction counter to that of line 11 retrieval. Thus, by pivoting the spool 5 (about axis CC-CC) in conjunction with shifting line guides 13 and 15 to opposite sides of the spool 5, the line 11 is capable of being dispensed over the unsupported and open end of the spool 5. It should be noted, that while a second support chassis 72 is described in the present invention, the functionality of the second support chassis 72 can be provided by any structure (such as a fishing rod, etc.) whose position with respect to the first support chassis 70 is not altered even while the axis of the spool support chassis 70 is pivoting from a first position to a second position in order to facilitate the means to enable the line 11 that has been wound upon the spool 5 to be paid out again without the requirement that the spool 5 revolve in a direction counter to that of line 11 retrieval.

With the incorporation of a second support chassis 72, the line guides 13 and 15 can be made to shift to the line 11 dispensing position without the inclusion of a line guide pivot switch (29 or 61). This is accomplished by taking advantage of the rotation of the spool support chassis 70 (about axis CC-CC) relative to the second support chassis 72 (or as just explained, taking advantage of the rotation of any structure (such as a fishing rod, etc.) whose position with respect to the first support chassis 70 is not altered even while the axis of the spool support chassis 70 is pivoting from a first position to a second position in order to facilitate the means to enable the line 11 that has been wound upon the spool 5 to be paid out again without the requirement that the spool 5 revolve in a direction counter to that of line 11 retrieval). For example, in FIG. 17 gear 74 is rigidly attached to the top of line guide 13, and gear 76 is rigidly attached to line guide 15. Gears 74 and 76 are not in driving contact with each other, but both gear 74 and gear 76 are in driving contact with a third gear 78 whose axis of rotation is supported by the second support chassis 72. Gear 74, and thus, line guide 13, is rotatably supported by the spool support chassis 70, while gear 76, line guide 15, and gear 78 are rotatably supported by the second support chassis 72. A groove (Position V) is provided in the spool support chassis 70 in order to enable line guide 15 (that is supported by the second support chassis 72) to remain in a fixed position as the combination of the spool 5 and the spool support chassis 70 are pivoted (about axis CC-CC) to the line dispensing position. Because gear 74 and gear 78 are in driving contact, the orbit of the axis of gear 74 about gear 78 as the spool 5 and spool support chassis 70 are pivoted to the line 11 dispensing position (while the second support chassis 72 remains static), gear 74 imparts a rotational motive force on gear 78. Further, because gear 76 and gear 78 are in driving contact, the rotational motive force imparted to gear 78 (by gear 74) causes gear 76, and thus line guide 15, to rotate in an equal but opposite direction as the pivot of gear 74 (and thus line guide 13). Thus, the pivot of the spool support chassis 70 relative to the second support chassis 72 causes line guides 13 and 15 to shift to a second position of line 11 dispensing where the line guides 13 and 15 are now located on opposite sides of the spool 5. It should be noted that while FIG. 17 depicts the spool support chassis 70 rotating or pivoting counter counter-clockwise with respect to the second support chassis 72, the present invention is equally applicable for rotations or pivots of two or more bodies in a clockwise direction. Further, although the axis of pivot (axis CC-CC) of spool support chassis 70 is shown to be in a vertical direction in FIG. 17, the present invention is equally suitable to any orientation or direction of pivot, whether the axis of pivot is horizontal, vertical, or any angle in between. Further, it should be noted that while FIG. 17 depicts the use of gears to convert the rotation of one support chassis relative to another into a motive force in order to pivot the line guides 13 and 15 from a first position to a second position, this same feat can be accomplished by any method or combination of components that are capable of converting a rotational movement of one body against another into a rotation of the line guides 13 and 15. For example, this can be accomplished by any arrangement of lever arms, belts, pulleys, sprockets, cables, cords, springs, cams, rollers, wheels, magnetic devices, linear actuators, racks, rails, sensors, switches, clutches, hydraulic devices, electrical devices, gears, chains, shafts, etc., and the design and/or sequence of the components incorporated to pivot the line guides 13 and 15 to the line 11 disseminating position and back to the line 11 retrieve position may vary without straying from the purview of the present invention.

Figure 18:
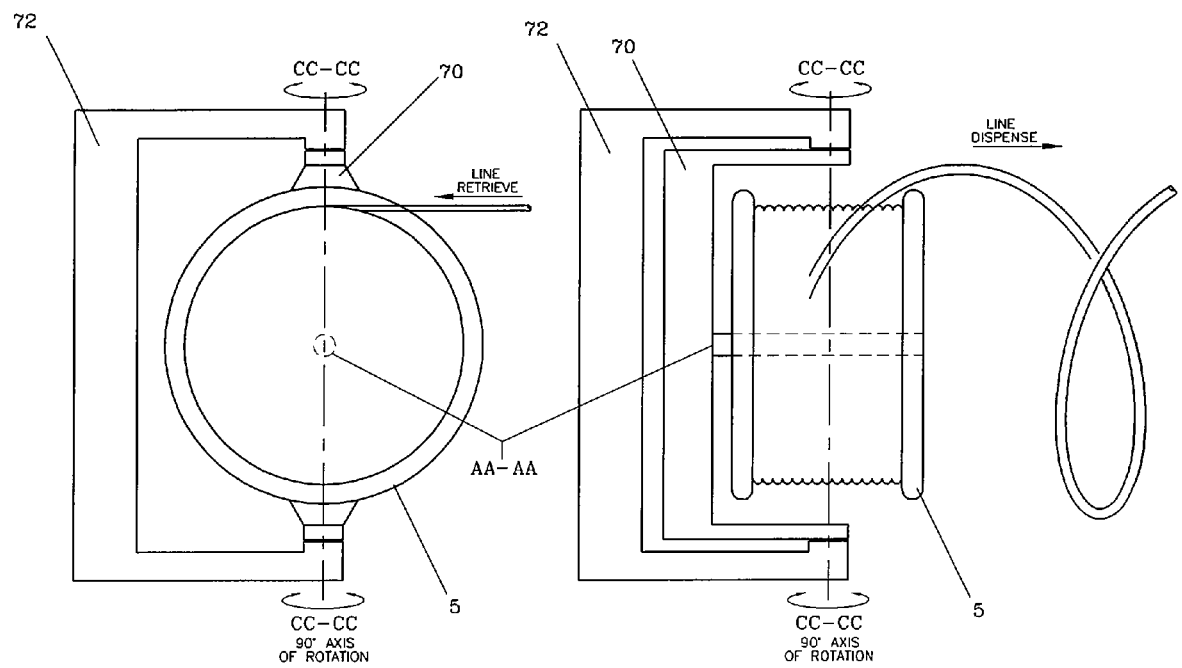
FIG. 18 is a side view of a spool supported on a single end by a housing with the spool positioned in the line-retrieve position in the left-hand view, and the spool rotated 90 degrees to the line-dissemination position in the right-hand view.

FIG. 18 is a simplified side view of the scenario depicted in FIG. 17 whereby the spool 5 is supported on a single side (along the spool's 5 axis of revolution AA-AA) by the spool support chassis 70, and the spool 5 (or the combination of the spool support chassis 70 and the spool 5) is rotatably affixed (about axis CC-CC) to a second support chassis 72. The second support chassis 72 allows the spool 5 (or the combination of the spool support chassis 70 and the spool 5) to pivot (about axis CC-CC) in order to facilitate the means to enable the line 11 that has been wound upon the spool 5 to be paid out again without the requirement that the spool 5 revolve in a direction counter to that of line 11 retrieval. Even though a ninety-degree rotation of the spool chassis 70 (and therefore the spool 5) about axis CC-CC is shown in FIG. 18, any degree of rotation about axis CC-CC is permitted.

Figure 19:
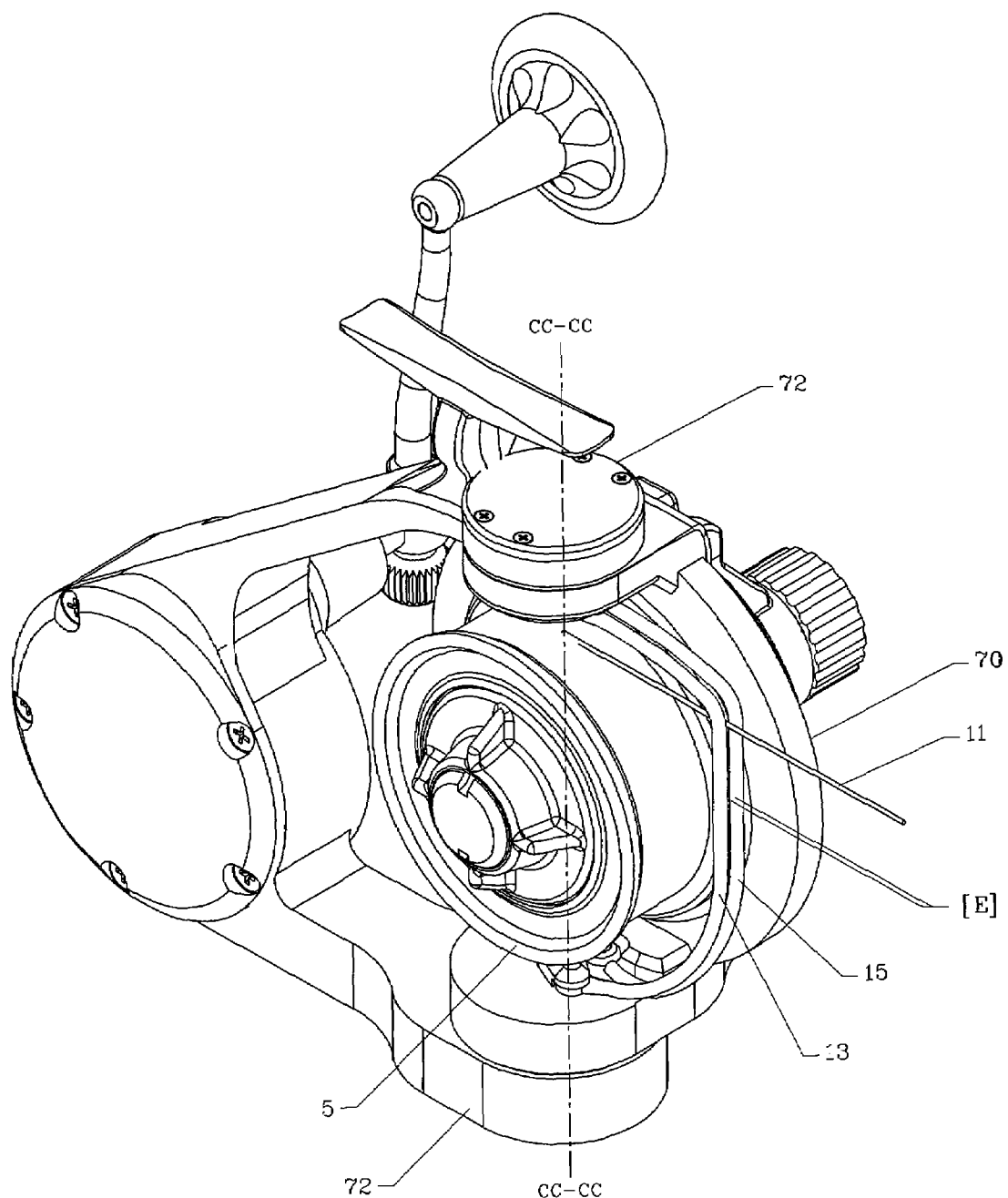
FIG. 19 is a is a frontal perspective of a fishing reel incorporating the present invention where the line guides are positioned in the line guiding position

FIG. 19 is a frontal perspective of a fishing reel incorporating the present invention in order to evenly distribute the line 11 across the axial width of the spool 5 as the spool 5 is revolved about its axis in order to retrieve the line 11. In the configuration of FIG. 19, the line guides 13 and 15 are pivoted close together and have captured the line 11 in slot E. Therefore, as line guides 13 and 15 oscillate to one axial end of the spool 5 and then to the other, slot E—and therefore the line 11—also oscillates across the axial width of the spool 5 thereby evenly distributing the line 11 across the entire face of the spool 5. The fishing reel also incorporates a second support chassis 72 so that the pivot (about axis CC-CC) of the spool support chassis 70 (relative to the second support chassis 72) is capable of causing the line guides 13 and 15 to shift to the line 11 dispensing position in the manner described above.

Figure 20:
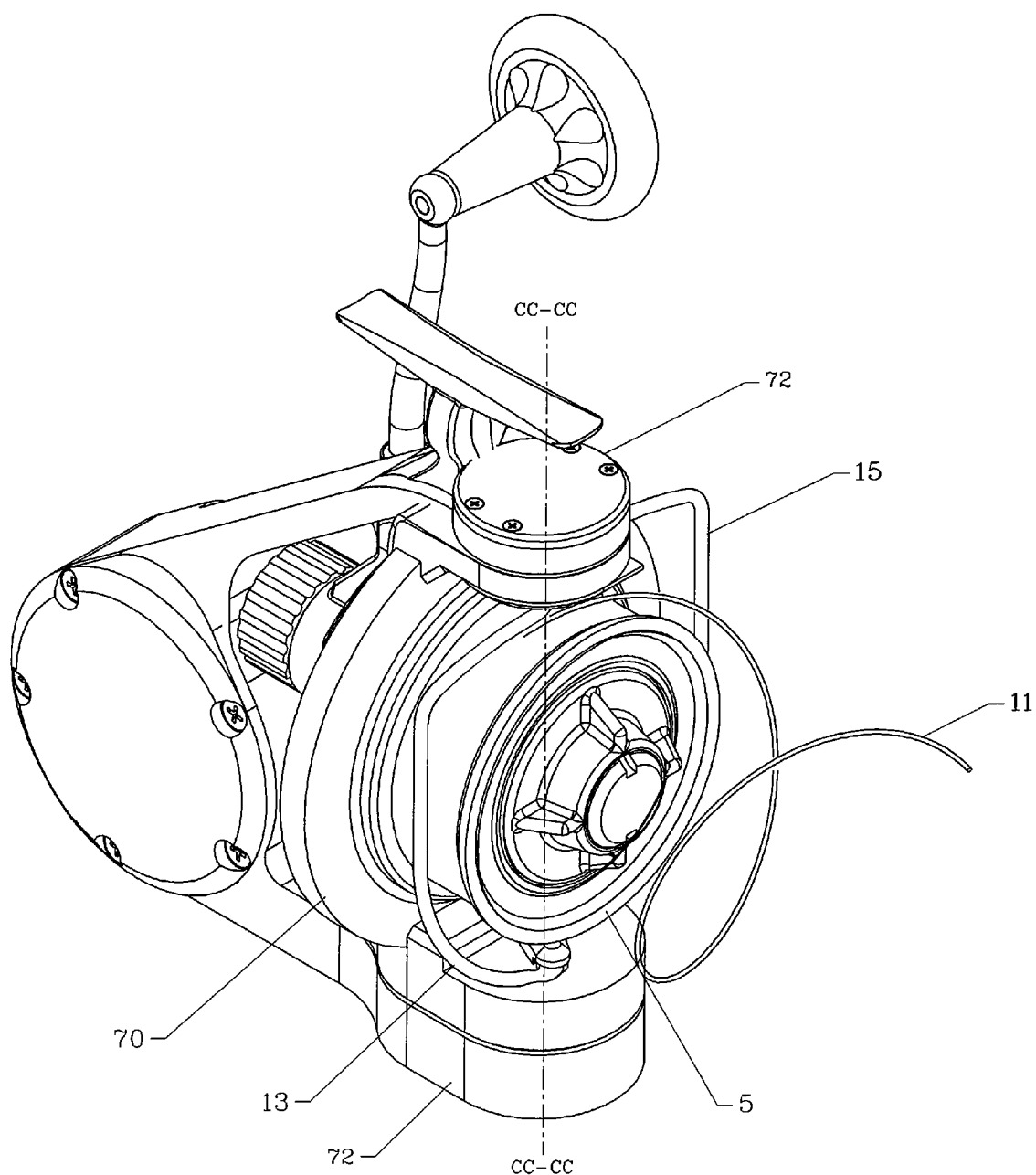
FIG. 20 is a is a frontal perspective of a fishing reel incorporating the present invention where the line guides are shifted to the line dispensing position and spool also pivoted to allow the line to be dispensed from the open end of the spool

In FIG. 20 the spool 5 and the spool support chassis 70 of the fishing reel has been pivoted (about axis CC-CC) counter-clockwise (with respect to the second support chassis 72) in order to enable the line 11 to be dispensed over the unsupported end of the spool 5, thus negating the requirement that the spool 5 revolve about its axis in order to dispense the line 11. As the spool 5 and spool support chassis 70 were pivoted (about axis CC-CC) with respect to the second support chassis 72, line guides 13 and 15 were shifted to opposite sides of the spool 5 (utilizing the criteria described in FIG. 17 above) so that the line 11 is capable of being dispensed over the unsupported and open end of the spool 5 with absolutely no interference by the level wind mechanism.

In summary, the linear motive force described in the above-noted example provides the linear movement of the line 11 guides 13 and 15 from left to right and vice versa in order to distribute the line 11 across the axial width of the spool 5 by a pivoting action of the line 11 guides 13 and 15 (about a single pivot point) from the first position to the second position. It can be seen that the guides 13 and 15 can be selectively repositioned from the line 11 retrieval position (first position) to the line 11 dissemination position (second position) without first having to be disengaged from, or reconnected to their motive force.

Generally, in a spool 5 that is being revolved about an axis in order to retrieve a line 11, the invention provides at least one guide 13 and/or 15 for distributing the line 11, wherein the guide 13 and/or 15 is pivotally connected to a pivot point so that the guide 13 and/or 15 can be selectively rotated between a first position and a second position about the pivot point. The pivot connection at the pivot point defines an axis of pivot. The outer perimeter of the guide 13 and/or 15 is disposed outside of the axis of pivot. The guide 13 and/or 15 can be selectively pivoted between a first position and a second position wherein the orientation of the guide 13 and/or 15 in the first position is generally disposed within the spool 5; wherein the orientation of the guide 13 and/or 15 in the second position is generally non-disposed within the spool 5. A pivot mechanism is provided for causing the guide 13 and/or 15 to be selectively pivoted between the first position and the second position. The guide 13 and/or 15 remains in driving contact with the pivot mechanism during the selective pivot from the first position to the second position. The guide 13 and/or 15 remains in driving contact with its motive force during the selective pivot from the first position to the second position.

The invention can also be generally described as a method for selective line 11 retrieval and line 11 dissemination. In a spool 5 that is being revolved about an axis in order to retrieve a line 11, the method for distributing the line 11 evenly across the width of a spool 5 by guiding the line 11 via an open-ended slot; the level-wind mechanism comprising: (a) at least one guide 13 or 15 configured in such a manner as to have two sides and an open end or multiple guides 13 and 15 configured in such a manner as to form a slot with two sides and an open end and (b) a motive force to oscillate the guides 13 and 15 back and forth across the width of the spool 5. The oscillation of the guides 13 and 15 can follow any shaped path including a linear path, curvilinear path, arcing path, etc. The method further includes a mechanism to shift the level-wind guides 13 and 15 to a second position so that the level-wind guides 13 and 15 do not interfere with the line 11 as the line 11 is being dispensed from the spool 5.

The level-wind guides 13 and 15 are oriented in a first position and then in a second position; wherein the orientation of the level-wind guides 13 and 15 in the first position are capable of guiding the line 11 during the line 11 retrieval and orientation of the level-wind guides 13 and 15 in the second position are positioned out of the way to allow for the dissemination of the line 11.

The method may also be described in a level-wind mechanism with a guide slot created by at least one guide 13 or 15, as a method for selective line 11 guiding during retrieve, and selective line 11 dissemination comprising: (a) orienting the guides 13 and 15 in a first position in order to capture the line 11 within the guides 13 and 15, (b) oscillating the guides 13 and 15 from one axial end of the spool 5 to the other axial end of the spool 5 in order to evenly distribute the line 11 during retrieve, (c) shifting the guides 13 and 15 to a second position in order to allow the line 11 to be dispensed from the spool 5 without interference from the guides 13 and 15, (d) dispensing the line 11 from the spool 5; (e) Wherein steps (a) through (d) do not require a disengagement of the at least one guide 13 or 15 from the motive force, (f) Wherein steps (a) through (d) do not require a disengagement of the at least one guide 13 or 15 from the pivot mechanism.

As can be seen from the above-description, embodiments of the invention include some or all of the following features and components:

A line guiding mechanism for distributing line along an axial length of a spool supported by a spool housing, comprising: a pair of line guides, wherein the line guides are generally incurvate along their length, and wherein each line guide is coupled at at least one end to its supporting structure and transverse to the axial length of the spool such that the central portion of the line guide is disposed in front of the spool; and a driving mechanism for providing motion to each line guide such that the central portion of the line guides follow along selected arcuate paths about an axis defined by the line guide's ends; wherein said driving mechanism effects oscillation of the pair of line guides in cooperative arcuate paths in front of the spool to evenly distribute line positioned between the pair of line guides along the axial length of the spool. In this line guiding mechanism, said arcuate paths substantially traverse the axial length of the spool. The driving mechanism imparts an oscillatory motion to each line guide. The pair of line guides move between a first line retrieving position and a second line dispensing position. The first line retrieving position comprises positioning the pair of line guides in a parallel relationship forming a slot therebetween for capture of the line and oscillating of the pair of line guides in cooperative arcuate paths in front of the spool to evenly distribute line along the axial length of the spool. The second line dispensing position comprises separation of the central portion of each line guide in divergent arcuate paths. In further embodiments, the line guides remain separated at substantially opposite axial ends of the spool throughout dispensing of the line. Moreover, the driving mechanism imparts an oscillatory motion to each line guide. The imparted oscillatory motion is derived from the motive force applied to revolve the spool when retrieving the line. The driving mechanism reverses the direction of travel of the pair of line guides upon reaching axial ends of the spool. Still further, the driving mechanism comprises an activation switch for effecting separation of the central portion of each line guide in divergent arcuate paths. The line guides remain separated at substantially opposite axial ends of the spool while said switch is activated for dispensing of the line. Further, the pair of line guides are capable of remaining in driving contact with said driving mechanism as said line guides move between the first line retrieving position and the second line dispensing position. Moreover, the line guiding mechanism further comprises a compliancy device to allow the line guide to flex due to forces on the line.

The invention can further be described as having the following features and components:

A line guiding mechanism for distributing line along an axial length of a spool supported by a supporting structure, comprising: a pair of line guides, wherein each line guide is coupled at at least one end transverse to the axial length of the spool such that the central portion of the line guide is disposed in front of the spool; a switch for providing motion of the said pair of line guides between (a) a first line retrieving position wherein said pair of line guides are positioned in a parallel relationship forming a slot therebetween for capture of the line in the first line retrieving position and (b) a second line dispensing position wherein said central portion of the pair of line guides separate in divergent arcuate paths about an axis defined by the line guide's ends; a driving mechanism for providing motion to the pair of line guides wherein said pair of line guides in said first position of line retrieving traverse the axial length of the spool in unison along a linear path.

The line guiding mechanism described above is further described such that said driving mechanism comprises a self-actuation that reverses the direction of travel of the pair of line guides upon reaching axial ends of the spool. The driving mechanism comprises an activation switch for effecting separation of the central portion of each line guide in divergent arcuate paths. The pair of line guides are capable of remaining in driving contact with said driving mechanism as said line guides move between the first line retrieving position and the second line dispensing position. It may further comprise a compliancy device to allow the line guide to flex due to forces on the line.

The invention can further be described as having the following features and components:

A line guiding mechanism for distributing line along an axial length of a spool supported by a supporting structure, comprising: a bifurcated line guide with at least one end coupled to the supporting structure, wherein the line guide has a closed end and an open end, said open end forming an elongated slot through which a line is captured, such that the elongated slot is transverse to the axial length of the spool and disposed in front of the spool; a driving mechanism for providing oscillatory motion to the line guide along an arcuate path about an axis transverse to the axial length of the spool and intersecting the at least one end of the line guide that is coupled to the spool housing; wherein said line guide can be selectively positioned between (a) a first line retrieving position wherein the elongated slot of said line guide is capable of substantially traversing the axial length of the spool in order to evenly distribute the line and (b) a second line dispensing position wherein said line guide is located non-disposed within the spool to allow payout of the line without interference.

The line guiding mechanism described above is further described such that the line guide is generally incurvate along its length. The elongated slot substantially traverses the axial length of said spool along an arcuate path. The driving mechanism imparts an oscillatory motion to said line guide. The driving mechanism comprises a self-actuation that reverses the direction of travel of said line guide upon reaching axial ends of the spool. Moreover, the driving mechanism comprises an activation switch for effecting the positioning of said line guide from a first line retrieving position to a second line dispensing position. Still further, the line guide remains in second line dispensing position while said switch is activated for dispensing of the line. The line guide remains in driving contact with said driving mechanism as said line guide is positioned between the first line retrieving position and the second line dispensing position. It may further comprise a compliancy device to allow the line guide to flex due to forces on the line.

The invention can further be described as having the following features and components:

In a convertible fishing reel selectively positionable between a first line retrieving position wherein the line retrieve is substantially perpendicular to the axial length of the spool, and a second line dispensing position wherein the line payout is substantially parallel to the axial length of the spool, having a main supporting structure and a spool supporting structure, wherein the spool supporting structure receives a spool, and wherein said spool supporting structure can be selectively rotated between the first line retrieving position and the second line dispensing position, an improved line guiding mechanism comprising: a pair of line guides, wherein the line guides are generally incurvate along their length, and wherein each line guide is coupled at at least one end to its supporting structure such that the central portion of the line guide is disposed in front of the spool, and wherein said line guides can be selectively positioned between (1) a first line retrieving position wherein the pair of line guides are positioned in a parallel relationship forming a slot therebetween for capture of the line and oscillation in cooperative arcuate paths in front of the spool to evenly distribute line along the axial length of the spool and (2) a second line dispensing position wherein said pair of line guides separate to either side of the spool in divergent arcuate paths about an axis defined by the line guide's ends.

In a further embodiment, the spool supporting structure may be selectively rotated about an axis of rotation that is generally disposed within the spool. The pair of line guides remain separated in the second line dispensing position to allow payout of the line without interference. The rotating of the spool supporting structure between the first line retrieving position and the second line dispensing position effects positioning of the line guides between the first line retrieving position and the second line dispensing position. It may further comprise a driving mechanism for imparting an oscillatory motion to each line guide along selected arcuate paths about an axis defined by the line guide's ends. Moreover, the pair of line guides are capable of remaining in driving contact with said driving mechanism as said line guides move between the first line retrieving position and the second line dispensing position. It may further include a compliancy device to allow the line guides to flex due to forces on the line.

In still a further embodiment, the invention can further be described as having the following features and components:

A line guiding mechanism for distributing line along an axial length of a spool supported by a spool supporting structure, comprising: a pair of line guides, wherein the line guides are generally incurvate along their length, and wherein each line guide is coupled at at least one end to the spool supporting structure transverse to the axial length of the spool such that the central portion of the line guide is disposed in front of the spool; and means for providing motion to each line guide such that the central portion of the line guides follow along selected arcuate paths about an axis defined by the line guide's ends; wherein said means for providing motion effects oscillation of the pair of line guides in cooperative arcuate paths in front of the spool to evenly distribute line positioned between the pair of line guides along the axial length of the spool and wherein said means for providing motion effects separation of the pair of line guides in divergent arcuate paths.

In still a further embodiment, the invention can further be described as having the following features and steps:

A method for guiding line onto a spool, comprising: oscillating a pair of line guides in cooperative arcuate paths in front of the spool to evenly distribute line positioned between the pair of line guides along the axial length of the spool during line retrieval such that the central portion of the line guides follow along selected arcuate paths in front of the spool about an axis defined by the line guide's ends and wherein each line guide is coupled at at least one end to their supporting structure so that they are transverse to the axial length of the spool such that the ends pivot at the point of coupling; and separating the pair of line guides in divergent arcuate paths during line dispensing.

In still a further embodiment, the invention can further be described as having the following features and components:

A line guiding mechanism for distributing line along an axial length of a spool supported by a supporting structure, comprising: a bifurcated line guide that has a closed end and an open end, said open end forming an elongated slot through which a line is captured, such that the elongated slot is transverse to the axial length of the spool and is disposed in front of the spool; a driving mechanism for providing motion to the line guide so that elongated slot substantially traverses the axial length of spool in a parallel fashion along a linear path.

In a further embodiment, the line guide can be selectively positioned between (a) a first line retrieving position wherein the elongated slot of said line guide is capable of substantially traversing the axial length of the spool in order to evenly distribute the line and (b) a second line dispensing position wherein said line guide is located non-disposed within the spool to allow payout of the line without interference. Still further, said driving mechanism comprises an activation switch for effecting the positioning of said line guide from said first line retrieving poison to said second line dispensing position. The line guide remains in driving contact with said driving mechanism as said line guide moves between the first line retrieving position and the second line dispensing position. The driving mechanism comprises a self-actuation that reverses the direction of travel of the said line guide upon reaching the axial ends of the spool. The line guide is coupled at at least one position to said driving mechanism. It may further comprise a compliancy device to allow the line guide to flex due to forces on the line.

It should be noted that while each drawing of the present invention depicts a spool revolving about a horizontal axis, the present invention is equally useful for all orientations of spool support regardless of the direction or angle of the axis upon which it revolves, the physical dimensions of the spool, the manner upon which the spool or the level-wind device receives its motive force, etc. And, while preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and should be included within the scope of the invention. Accordingly, the scope of protection is not limited to the embodiments described herein.

The invention claimed is:

1. A line guiding mechanism for distributing line along an axial length of a spool supported by a spool housing, comprising:
   a pair of line guides, wherein the line guides are generally incurvate along their length, and wherein each line guide is coupled at at least one end to its supporting structure and transverse to the axial length of the spool such that the central portion of the line guide is disposed in front of the spool; and
   a driving mechanism for providing motion to each line guide such that the central portion of the line guides follow along selected arcuate paths about an axis defined by the line guide's ends; wherein said driving mechanism effects oscillation of the pair of line guides in cooperative arcuate paths in front of the spool to evenly distribute line positioned between the pair of line guides along the axial length of the spool.

2. The line guiding mechanism of claim 1 wherein said arcuate paths substantially traverse the axial length of the spool.

3. The line guiding mechanism of claim 1 wherein said driving mechanism imparts an oscillatory motion to each line guide.

4. The line guiding mechanism of claim 1 wherein said driving mechanism moves said pair of line guides between a first line retrieving position and a second line dispensing position.

5. The line guiding mechanism of claim 4 wherein said first line retrieving position comprises positioning the pair of line guides in a parallel relationship forming a slot therebetween for capture of the line and oscillating of the pair of line guides in cooperative arcuate paths in front of the spool to evenly distribute line along the axial length of the spool.

6. The line guiding mechanism of claim 4 wherein said second line dispensing position comprises separation of the central portion of each line guide in divergent arcuate paths.

7. The line guiding mechanism of claim 6 wherein said line guides remain separated at substantially opposite axial ends of the spool throughout dispensing of the line.

8. The line guiding mechanism of claim 7 wherein said driving mechanism imparts an oscillatory motion to each line guide.

9. The line guiding mechanism of claim 8 wherein said imparted oscillatory motion is derived from the motive force applied to revolve the spool when retrieving the line.

10. The line guiding mechanism of claim 4 wherein the pair of line guides remain in driving contact with said driving mechanism as said line guides move between the first line retrieving position and the second line dispensing position.

11. The line guiding mechanism of claim 10 further comprising a compliancy device to allow the line guide to flex due to forces on the line.

12. The line guiding mechanism of claim 1 wherein said driving mechanism reverses the direction of travel of the pair of line guides upon reaching axial ends of the spool.

13. The line guiding mechanism of claim 1 wherein said driving mechanism comprises an activation switch for effecting separation of the central portion of each line guide in divergent arcuate paths.

14. The line guiding mechanism of claim 13 wherein said line guides remain separated at substantially opposite axial ends of the spool while said switch is activated for dispensing of the line.

15. A line guiding mechanism for distributing line along an axial length of a spool supported by a supporting structure, comprising:
   a bifurcated line guide with at least one end coupled to the supporting structure, wherein the line guide has a closed end and an open end, said open end forming an elongated slot through which a line is captured, such that the elongated slot is transverse to the axial length of the spool and disposed in front of the spool, wherein the line guide is generally incurvate along its length;
   a driving mechanism for providing oscillatory motion to the line guide along an arcuate path about an axis transverse to the axial length of the spool and intersecting the at least one end of the line guide that is coupled to the spool housing; wherein said line guide can be selectively positioned between (a) a first line retrieving position wherein the elongated slot of said line guide is capable of substantially traversing the axial length of the spool in order to evenly distribute the line and (b) a second line dispensing position wherein said line guide is located non-disposed within the spool to allow payout of the line without interference.

16. The line guiding mechanism of claim 15 wherein said elongated slot substantially traverses the axial length of said spool along an arcuate path.

17. The line guiding mechanism of claim 16 wherein said driving mechanism comprises a self-actuation that reverses the direction of travel of said line guide upon reaching axial ends of the spool.

18. The line guiding mechanism of claim 16 wherein said driving mechanism comprises an activation switch for effecting the positioning of said line guide from a first line retrieving position to a second line dispensing position.

19. The line guiding mechanism of claim 18 wherein said line guide remains in second line dispensing position while said switch is activated for dispensing of the line.

20. The line guiding mechanism of claim 15 wherein said driving mechanism imparts an oscillatory motion to said line guide.

21. The line guiding mechanism of claim 15 wherein said line guide remains in driving contact with said driving mechanism as said line guide is positioned between the first line retrieving position and the second line dispensing position.

22. The line guiding mechanism of claim 15 further comprising a compliancy device to allow the line guide to flex due to forces on the line.

23. In a convertible fishing reel selectively positionable between a first line retrieving position wherein the line retrieve is substantially perpendicular to the axial length of the spool, and a second line dispensing position wherein the line payout is substantially parallel to the axial length of the spool, having a main supporting structure and a spool supporting structure, wherein the spool supporting structure receives a spool, and wherein said spool supporting structure can be selectively rotated between the first line retrieving position and the second line dispensing position, an improved line guiding mechanism comprising:

a pair of line guides, wherein the line guides are generally incurvate along their length, and wherein each line guide is coupled at at least one end to its supporting structure such that the central portion of the line guide is disposed in front of the spool, and wherein said line guides can be selectively positioned between (1) a first line retrieving position wherein the pair of line guides are positioned in a parallel relationship forming a slot therebetween for capture of the line and oscillation in cooperative arcuate paths in front of the spool to evenly distribute line along the axial length of the spool and (2) a second line dispensing position wherein said pair of line guides separate to either side of the spool in divergent arcuate paths about an axis defined by the line guide's ends.

24. The improved line guiding mechanism of claim 23 wherein the spool supporting structure is selectively rotated about an axis of rotation that is generally disposed within the spool.

25. The improved line guiding mechanism of claim 23 wherein the pair of line guides remain separated in the second line dispensing position to allow payout of the line without interference.

26. The improved line guiding mechanism of claim 23 wherein the rotating of the spool supporting structure between the first line retrieving position and the second line dispensing position effects positioning of the line guides between the first line retrieving position and the second line dispensing position.

27. The improved line guiding mechanism of claim 23, further comprising a driving mechanism for imparting an oscillatory motion to each line guide along selected arcuate paths about an axis defined by the line guide's ends.

28. The improved line guiding mechanism of claim 27, wherein the pair of line guides remain in driving contact with said driving mechanism as said line guides move between the first line retrieving position and the second line dispensing position.

29. The line guiding mechanism of claim 23 further comprising a compliancy device to allow the line guides to flex due to forces on the line.

30. A line guiding mechanism for distributing line along an axial length of a spool supported by a spool supporting structure, comprising:

a pair of line guides, wherein the line guides are generally incurvate along their length, and wherein each line guide is coupled at at least one end to the spool supporting structure transverse to the axial length of the spool such that the central portion of the line guide is disposed in front of the spool; and means for providing motion to each line guide such that the central portion of the line guides follow along selected arcuate paths about an axis defined by the line guide's ends; wherein said means for providing motion effects oscillation of the pair of line guides in cooperative arcuate paths in front of the spool to evenly distribute line positioned between the pair of line guides along the axial length of the spool and wherein said means for providing motion effects separation of the pair of line guides in divergent arcuate paths.

* * * * *